United States Patent
Xiong

(10) Patent No.: US 11,616,754 B2
(45) Date of Patent: Mar. 28, 2023

(54) COMMUNICATION METHOD AND APPARATUS BASED ON EDGE COMPUTING, STORAGE MEDIUM, AND ELECTRONIC DEVICE

(71) Applicant: Tencent Technology (Shenzhen) Company Limited, Guangdong (CN)

(72) Inventor: Chunshan Xiong, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 17/677,740

(22) Filed: Feb. 22, 2022

(65) Prior Publication Data

US 2022/0182358 A1 Jun. 9, 2022

Related U.S. Application Data

(63) Continuation of application No. PCT/CN2020/126432, filed on Nov. 4, 2010.

(30) Foreign Application Priority Data

Mar. 15, 2020 (CN) .......................... 202010179051.0

(51) Int. Cl.
*H04L 61/2517* (2022.01)
*H04L 61/2521* (2022.01)
*H04L 61/4511* (2022.01)

(52) U.S. Cl.
CPC ...... *H04L 61/2535* (2013.01); *H04L 61/2517* (2013.01); *H04L 61/4511* (2022.05)

(58) Field of Classification Search
None
See application file for complete search history.

(56) References Cited

U.S. PATENT DOCUMENTS 9,055,117 B1 6/2015 Dickinson et al.
9,106,468 B1 * 8/2015 Sun .................. H04L 67/14
(Continued)

FOREIGN PATENT DOCUMENTS

CN 107113343 A 8/2017
CN 109076628 A 12/2018
(Continued)

OTHER PUBLICATIONS

3GPP TR 23.748 V0.3.0 (Jan. 2020) Technical Report—3rd Generation Partnership Project, Technical Specification Group Services and System Aspects, Study on enhancement of support for Edge Computing in 5G Core network (5GC) (Release 17); 3GPP Organizational Partners (ARIB, ATIS, CCSA, ETSI, TSDSI, TTA, TTC); Feb. 3, 2020; 40 pages total, see Chapter 6 (pp. 15-39).

(Continued)

*Primary Examiner* — Angela Nguyen
(74) *Attorney, Agent, or Firm* — Crowell & Moring LLP

(57) ABSTRACT

Disclosed are a communication method and apparatus based on edge computing, a computer storage medium, and an electronic device. The communication method based on edge computing includes: receiving an uplink Internet Protocol (IP) packet transmitted by a user equipment, a destination address of the uplink IP packet being a network address of a target application server; determining a network address of a local edge server that is configured to respond to the uplink IP packet according to the network address of the target application server; and modifying the destination address of the uplink IP packet to the network address of the local edge server, and forwarding the modified uplink IP packet to the local edge server for processing.

20 Claims, 11 Drawing Sheets

(56) References Cited

U.S. PATENT DOCUMENTS

| | | | |
|---|---|---|---|
| 2015/0347246 A1* | 12/2015 | Matsui | G06F 3/0653 |
| | | | 714/4.12 |
| 2017/0289101 A1 | 10/2017 | Farag | |
| 2018/0012390 A1 | 7/2018 | Li et al. | |
| 2018/0192429 A1* | 7/2018 | Yang | H04L 69/163 |
| 2019/0372837 A1 | 12/2019 | Yang et al. | |

FOREIGN PATENT DOCUMENTS

| | | |
|---|---|---|
| CN | 109218455 A | 1/2019 |
| CN | 109951880 A | 6/2019 |
| CN | 110198307 A | 9/2019 |
| CN | 111343092 A | 6/2020 |
| WO | WO 01/82023 A2 | 11/2001 |

OTHER PUBLICATIONS

Zhenbo, Guo et al.; "CDN deployed in edge sites with MEC"; Nov. 20, 2019; Abstract; one page.
International Search Report dated Feb. 8, 2021 for International Application No. PCT/CN2020/126432; 4 pages, including English translation.
Written Opinion dated Feb. 8, 2021 for International Application No. PCT/CN2020/126432; 5 pages.
First Office Action dated Mar. 3, 2021 for Chinese Application No. 202010179051.0, including Concise Explanation of Relevance for Chinese Office Action.
SA WG2 Meeting #135, Oct. 14-18, 2019, Split, HR.
Office Action and Search Report issued on European application 20925153.7 dated Nov. 2, 2022, 10 pages.

* cited by examiner

COMMUNICATION METHOD AND APPARATUS BASED ON EDGE COMPUTING, STORAGE MEDIUM, AND ELECTRONIC DEVICE

RELATED APPLICATION

This application is based on and claims priority to International PCT Patent Application No. PCT/CN2020/126432 filed on Nov. 4, 2020, which is based on and claims priority to Chinese Patent Application No. 202010179051.0 filed on Mar. 15, 2020, both entitled "Communication Method and Apparatus Based on Edge Computing, Storage Medium, and Electronic Device". These prior applications are incorporated herein by reference in their entireties.

FIELD OF THE TECHNOLOGY

This application relates to the field of computer and communication technologies, and specifically to a communication method and apparatus based on edge computing, a computer storage medium, and an electronic device.

BACKGROUND OF THE DISCLOSURE

Edge Computing (EC) is a technology in which an application server (AS) is deployed at a location close to a user equipment (UE), in the form of an edge application server (EAS) close to the UE, to minimize a communication latency between the UE and the AS.

However, in order to ensure that the UE can access the local EAS, solutions in the related art generally need to modify or enhance the UE or the AS, thus having some limitations.

SUMMARY

Embodiments of the present disclosure provide a communication method and apparatus based on edge computing, a computer storage medium, and an electronic device, which realize access of the UE to the EAS with no need to modify or enhance the UE or the AS.

The embodiments of the present disclosure provide a communication method based on edge computing, including: receiving an uplink Internet Protocol (IP) packet transmitted by a user equipment, a destination address of the uplink IP packet being a network address of a target application server; determining a network address of a local edge server that is configured to respond to the uplink IP packet according to the network address of the target application server; and modifying the destination address of the uplink IP packet to the network address of the local edge server, and forwarding the modified uplink IP packet to the local edge server for processing.

The embodiments of the present disclosure also provide a communication method based on edge computing, including: receiving a network address of a target application server transmitted by a first user plane function entity, the network address of the target application server being a destination address in an uplink IP packet received by the first user plane function entity, and the uplink IP packet being transmitted by a user equipment; determining a network address of a local edge server that is configured to respond to the uplink IP packet according to the network address of the target application server; and transmitting an address translation control instruction to the first user plane function entity, the address translation control instruction being configured for instructing the first user plane function entity to modify the destination address of the uplink IP packet to the network address of the local edge server, and forward the modified uplink IP packet to the local edge server for processing.

The embodiments of the present disclosure also provide a communication method based on edge computing, including: receiving a network address of a target application server transmitted by a first user plane function entity, the network address of the target application server being a destination address in an uplink IP packet received by the first user plane function entity, and the uplink IP packet being transmitted by a user equipment; determining a network address of a local edge server that is configured to respond to the uplink IP packet according to the network address of the target application server; and transmitting an address translation control instruction to a second user plane function entity connected to the local edge server, the address translation control instruction being configured for instructing the second user plane function entity, in response to receiving the uplink IP packet transmitted by the user equipment to the target application server, to modify the destination address of the received uplink IP packet to the network address of the local edge server, and forward the modified uplink IP packet to the local edge server for processing.

The embodiments of the present disclosure also provide a communication method based on edge computing, including: receiving a network address of a target application server transmitted by a first user plane function entity, the network address of the target application server being a destination address in an uplink IP packet received by the first user plane function entity, and the uplink IP packet being transmitted by a user equipment; determining a network address of a local edge server that is configured to respond to the uplink IP packet according to the network address of the target application server; and transmitting an address translation control instruction to an uplink classifier connected to a second user plane function entity, the address translation control instruction being configured for instructing the uplink classifier, in response to receiving the uplink IP packet transmitted by the user equipment to the target application server, to modify the destination address of the received uplink IP packet to the network address of the local edge server, and forward the modified uplink IP packet to the local edge server for processing via the second user plane function entity.

The embodiments of the present disclosure also provide a communication apparatus based on edge computing, including: a first receiving unit, configured to receive an uplink IP packet transmitted by a user equipment, a destination address of the uplink IP packet being a network address of a target application server; a first determining unit, configured to determine a network address of a local edge server that is configured to respond to the uplink IP packet according to the network address of the target application server; and a first transmitting unit, configured to modify the destination address of the uplink IP packet to the network address of the local edge server, and forward the modified uplink IP packet to the local edge server for processing.

The embodiments of the present disclosure also provide a communication apparatus based on edge computing, including: a second receiving unit, configured to receive a network address of a target application server transmitted by a first user plane function entity, the network address of the target application server being a destination address in an uplink IP packet received by the first user plane function entity, and the uplink IP packet being transmitted by a user equipment; a second determining unit, configured to determine a network address of a local edge server that is configured to respond to the uplink IP packet according to the network address of the target application server; and a second transmitting unit, configured to transmit an address translation control instruction to the first user plane function entity, the address translation control instruction being configured for instructing the first user plane function entity to modify the destination address of the uplink IP packet to the network address of the local edge server, and forward the modified uplink IP packet to the local edge server for processing.

The embodiments of the present disclosure also provide a communication apparatus based on edge computing, including: a third receiving unit, configured to receive a network address of a target application server transmitted by a first user plane function entity, the network address of the target application server being a destination address in an uplink IP packet received by the first user plane function entity, and the uplink IP packet being transmitted by the user equipment; a third determining unit, configured to determine a network address of a local edge server that is configured to respond to the uplink IP packet according to the network address of the target application server; and a third transmitting unit, configured to transmit an address translation control instruction to a second user plane function entity connected to the local edge server, the address translation control instruction being configured for instructing the second user plane function entity, in response to receiving the uplink IP packet transmitted by the user equipment to the target application server, to modify the destination address of the received uplink IP packet to the network address of the local edge server, and forward the modified uplink IP packet to the local edge server for processing.

The embodiments of the present disclosure also provide a communication apparatus based on edge computing, including: a fourth receiving unit, configured to receive a network address of a target application server transmitted by a first user plane function entity, the network address of the target application server being a destination address in an uplink IP packet received by the first user plane function entity, and the uplink IP packet being transmitted by a user equipment; a fourth determining unit, configured to determine a network address of a local edge server that is configured to respond to the uplink IP packet according to the network address of the target application server; and a fourth transmitting unit, configured to transmit an address translation control instruction to an uplink classifier connected to a second user plane function entity, the address translation control instruction being configured for instructing the uplink classifier, in response to receiving the uplink IP packet transmitted by the user equipment to the target application server, to modify the destination address of the received uplink IP packet to the network address of the local edge server, and forward the modified uplink IP packet to the local edge server for processing via the second user plane function entity.

The embodiments of the present disclosure also provide a computer-readable medium, storing a computer program, the computer program, when being executed by a processor, implementing the communication method based on edge computing according to the above embodiments.

The embodiments of the present disclosure further provide an electronic device, including one or more processors; and a memory, configured to store one or more programs, the one or more programs, when executed by the one or more processors, causing the one or more processors to perform the communication method based on edge computing according to the foregoing embodiments.

In accordance with the communication method and apparatus based on edge computing, the computer storage medium, and the electronic device provided by the embodiments of the present disclosure, the user plane function entities (including the user plane function entity as the uplink classifier) are used to perform address translation and forwarding processing on data packets between the user equipment and the target application server. That is, the destination address of the uplink IP packet transmitted by the user equipment to the target application server is modified to the network address of the local edge server, and then the modified uplink IP packet is forwarded to the local edge server; in addition, the source address of the downlink IP packet returned for the uplink IP packet by the local edge server is modified to the network address of the target application server, and then the modified downlink IP packet is forwarded to the user equipment. This realizes access of the user equipment to the local edge server, with no need to modify or enhance the user equipment and the application server.

DESCRIPTION OF EMBODIMENTS

Exemplary implementations are now described more comprehensively with reference to the accompanying drawings. However, the examples of implementations may be implemented in various forms, and it is not to be understood as being limited to the examples described herein. Conversely, the implementations are provided to make the present disclosure more comprehensive and complete, and comprehensively convey the idea of the examples of the implementations to a person of ordinary skill in the art.

In addition, the described features, structures or characteristics may be combined in one or more embodiments in any appropriate manner. In the following descriptions, a lot of specific details are provided to give a comprehensive understanding of the embodiments of this application. However, a person skilled in the art is to be aware that, the technical solutions in the present disclosure may be implemented without one or more of the particular details, or another method, unit, apparatus, or step may be used. In other cases, well-known methods, apparatuses, implementations, or operations are not shown or described in detail, to avoid obscuring the aspects of this application.

The block diagrams shown in the accompanying drawings are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely examples for descriptions, do not need to include all content and operations/steps, and do not need to be performed in the described orders either. For example, some operations/steps may be further divided, while some operations/steps may be combined or partially combined. Therefore, an actual execution order may change according to an actual case.

Figure 1:
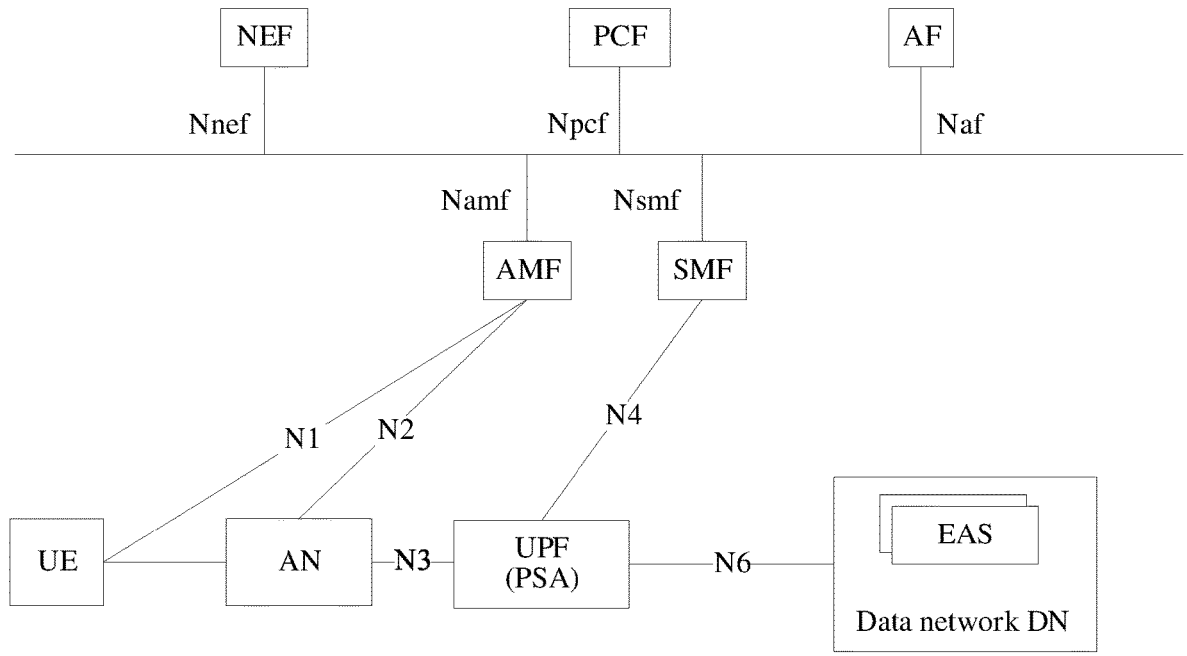
FIG. 1 is an example diagram of an edge computing architecture according to an embodiment of the present disclosure.
Figure 2:
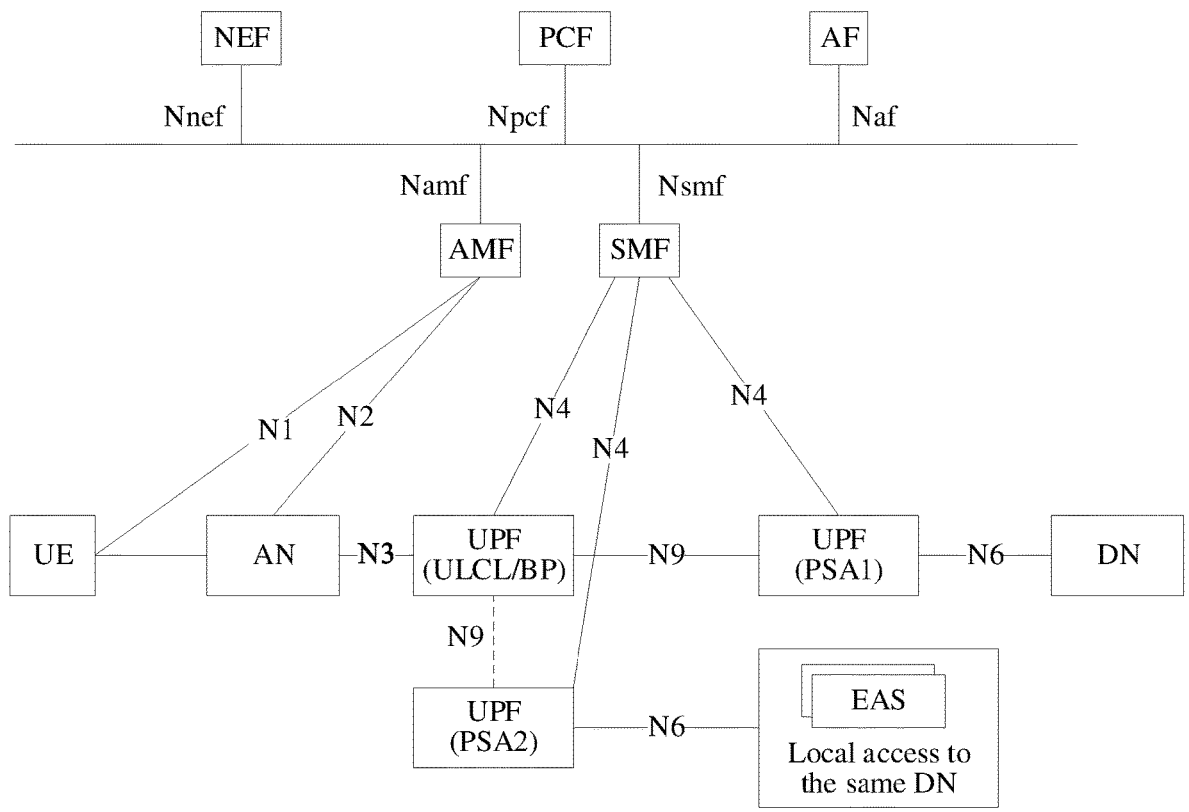
FIG. 2 is an example diagram of another edge computing architecture according to an embodiment of the present disclosure.

In an embodiment of the present disclosure, two architectures for realizing the EC are shown in FIG. 1 and FIG. 2. In FIG. 1, a user plane function (UPF)/protocol data unit (PDU) session anchor (PSA) is deployed near an access network (AN), and an EAS is deployed in a data network (DN) connected to the PSA. In FIG. 2, when a UPF/PSA1 is deployed in a central location, a UPF as an uplink classifier/branching point (UL CL/BP) is deployed near a PAST and then a UPF/PSA2 is branched out near the AN, and an EAS is deployed in the DN connected to the PSA2.

In the embodiments as shown in FIG. 1 and FIG. 2, NEF is an abbreviation for Network Exposure Function. Nnef refers to an interface via which the NEF provides services. Other network functions (NFs) transmit Nnef service requests to the NEF via this interface, and the NEF replies to the requests or transmits notification service messages via this interface. PCF is an abbreviation for Policy Control Function. Npcf refers to an interface via which the PCF provides services. Other NFs transmit Npcf service requests to the PCF via this interface, and the PCF replies to the requests and transmits notification service messages via this interface. AF is an abbreviation for Application Function. Naf refers to an interface via which the AF provides services. Other NFs transmit Naf service requests to the AF via this interface, and the AF replies to the requests and transmits notification service messages via this interface. AMF is an abbreviation for Access and Mobility Management Function. Namf refers to an interface via which the AMF provides services. Other NFs transmit Namf service requests to the AMF via this interface, and the AMF replies to the requests and transmit notification service messages via this interface. SMF is an abbreviation for Session Management Function. Nsmf refers to an interface via which the SMF provides services. Other NFs transmit Nsmf service requests to the SMF via this interface, and the SMF replies to the requests and transmits notification service messages via this interface. The UE and the AMF interact via a N1 interface, the AMF and the AN interact via a N2 interface, the SMF and the UPF(s) interact via a N4 interface, the AN and the UPF interact via a N3 interface, the UPF and the DN interact via a N6 interface, and one UPF and another UPF interact via a N9 interface.

In order to realize the access of the UE to the local EAS, the related art provides various solutions, basic strategies of which are as follows:

1) After the UE queries an IP address of the AS through a Domain Name System (DNS), the UPF or the SMF intercepts the DNS request and then replies a DNS response directing to an IP address of the local EAS, so as to allow the UE to establish an IP connection to the local EAS. However, this solution has disadvantages that if the UE transmits the DNS request over a protocol which encrypts DNS interaction messages such as a Hyper Text Transfer Protocol over Secure Socket Layer (HTTPS) or a Transport Layer Security (TLS), this solution is disabled due to the inability of the UPF to perceive the encrypted DNS interaction protocol.

2) The PCF transmits a UE route selection policy (URSP) rule to the UE. In this URSP rule, a rule that the UE attempts to access the AS when the UE is at a certain position is directed to an IP of the local EAS, so as to allow the UE to establish an IP connection with the EAS. However, this solution has disadvantages that the URSP rule needs to be enhanced and a behavior of the UE needs to be modified (that is, this rule can only be used when the UE is at a particular position).

3) The UE first accesses the AS at a central node. The AS determines the EAS according to a position of the UE or a position of a source IP address of the UE, and then redirects the IP connection of the UE to an IP address of the local EAS through application-level redirections or an AF request for user plane rerouting. However, this solution has disadvantages that the function of the AS needs to be enhanced, or it can only be applied to the AS that supports these redirections or supports the AF request for user plane rerouting.

Any solution that needs to modify or enhance UEs is costly in deployment due to a large number of the UEs. In addition, since ASs are generally used by Internet companies or vertical industries which are not controlled by operators, these Internet companies or vertical industries may not agree or are unwilling to modify or enhance their ASs. Accordingly, the embodiments of the present disclosure provide a solution which can realize an access of the UE to the EAS with no need to modify the UE or the AS. This solution not only has a low deployment cost, but also help realize a more effective deployment.

Figure 3:
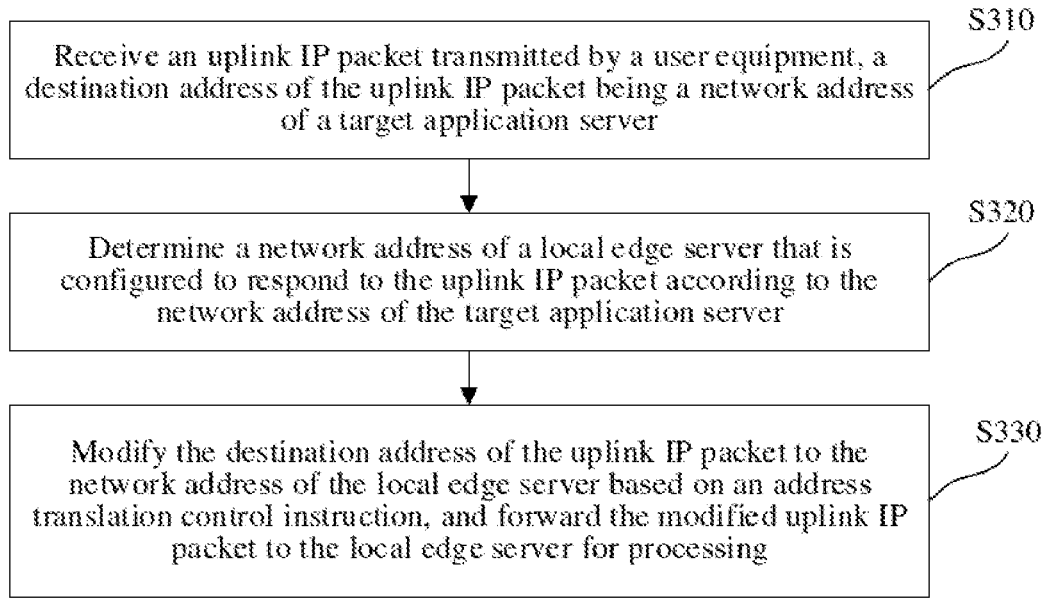
FIG. 3 is an example flowchart of a communication method based on edge computing according to an embodiment of the present disclosure.

FIG. 3 is a flowchart of a communication method based on edge computing according to an embodiment of the present disclosure. The communication method may be performed by a UPF entity. Referring to FIG. 3, the communication method includes at least step S310 to step S330. A detailed description is as follows:

Step S310. The UPF entity receives an uplink IP packet transmitted by a user equipment. A destination address of the uplink IP packet is a network address of a target application server.

In an embodiment of the present disclosure, the user equipment needs to obtain the network address of the target application server before transmitting the uplink IP packet. In some embodiments, the user equipment may obtain the network address of the target application server in the following manner: the user equipment transmits a DNS request to a DNS server via the UPF entity, and then the DNS server returns a DNS response including the network address of the target application server, so that the user equipment can obtain the network address of the target application server from the DNS response. In some embodiments, the DNS request may be based on a User Datagram Protocol (UDP), the HTTPS protocol, or the TLS protocol.

In an embodiment of the present disclosure, a source address of the uplink IP packet transmitted by the user equipment is an IP address of the user equipment, the destination address of the uplink IP packet is the network address of the target application server, a source port value of the uplink IP packet is a port value of the user equipment, a destination port value of the uplink IP packet is a port value of the target application server, and a transport layer protocol used by the uplink IP packet may be, but is not limited to, a Transmission Control Protocol (TCP) and the UDP.

Step S320. Determine a network address of a local edge server that is configured to respond to the uplink IP packet according to the network address of the target application server.

Figure 4:
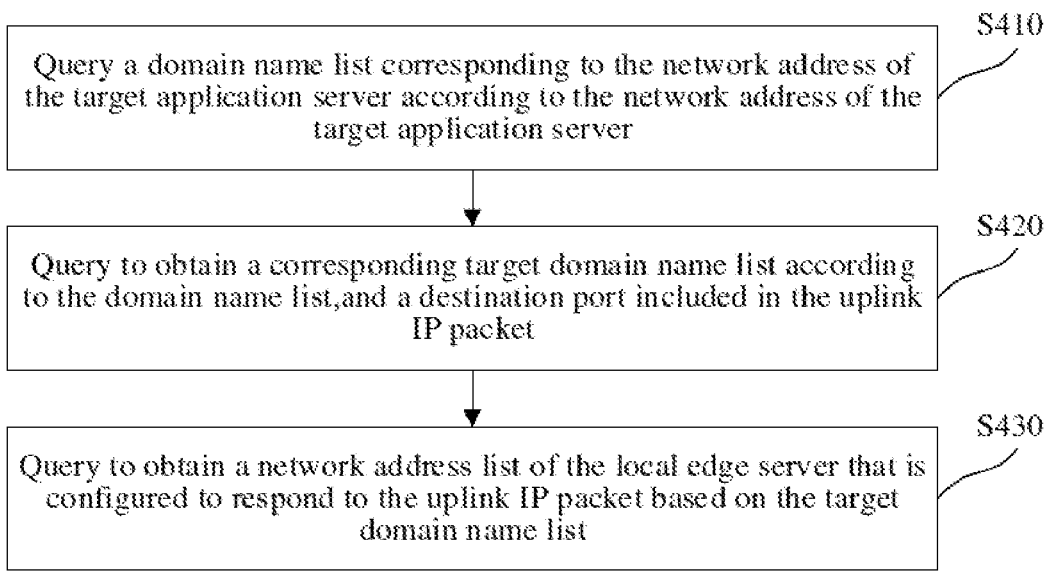
FIG. 4 is an example flowchart of determining a network address of a local edge server according to an embodiment of the present disclosure.

In an embodiment of the present disclosure, the UPF entity may determine the network address of the local edge server in a manner shown in FIG. 4, including step S410 to step S430:

Step S410. Query a domain name list corresponding to the network address of the target application server according to the network address of the target application server.

In an embodiment of the present disclosure, the UPF entity may transmit a reverse domain name lookup request to the DNS server according to the network address of the target application server, and then receive a reverse domain name lookup response returned by the DNS server, to obtain the domain name list corresponding to the network address of the target application server from the reverse domain name lookup response. The domain name list includes one or a plurality of domain names.

Step S420. Query to obtain a corresponding target domain name list according to the domain name list, the transport layer protocol used by the uplink IP packet, and a destination port included in the uplink IP packet.

In an embodiment of the present disclosure, a service record (SRV) query request may be initiated to an edge DNS server according to the domain name list, the used transport layer protocol (such as the TCP or the UDP, which may be obtained from a protocol field in an IP packet header) and the destination port, and then the target domain name list is obtained based on an SRV query response fed back from the edge DNS server. Similarly, the target domain name list may include one or a plurality of target domain names. The target domain name may be a fully qualified domain name (FQDN), namely a name with both a host name and a domain name.

Step S430. Query to obtain a network address list of the local edge server based on the target domain name list, and obtain the network address of the local edge server that is configured to respond to the uplink IP packet based on the network address list.

In an embodiment of the present disclosure, an A (Internet Protocol version 4 (IPv4) address record) or AAAA (Internet Protocol version 6 (IPv6) address record) query request may be initiated to the edge DNS server based on the target domain name list, to obtain the network address list of the local edge server. If the IP addresses of the user equipment and the target application server are IPv4, the A query request is initiated. If the IP addresses of the user equipment and the target application server are IPv6, the AAAA query request is initiated. Similarly, the network address list may also include one or a plurality of network addresses.

In an embodiment of the present disclosure, after querying to obtain the network address list of the local edge server, the UPF entity may report the network address list and the network address of the target application server to a SMF entity via the N4 interface, so as to allow the SMF entity to select the network address of the local edge server that is configured to respond to the uplink IP packet. For example, a network address of a local edge server that is closest to the user equipment, or has a lowest communication latency with the user equipment, or has a lightest load may be selected, to improve efficiency of edge communication.

In an embodiment of the present disclosure, the UPF entity may also report the network address of the target application server to the SMF entity, so as to allow the SMF entity to determine the network address of the local edge server according to the network address of the target application server.

In some embodiments, the SMF entity may determine the network address of the local edge server through steps similar to step S410 to step S430 shown in FIG. 4. Alternatively, the SMF entity may, based on a mapping relationship between a network address of an application server and a network address of a local edge server, use a network address of a local edge server having the mapping relationship with the network address of the target application server as the network address of the local edge server. Alternatively, the SMF entity may determine the domain name list corresponding to the network address of the target application server based on step S410 shown in FIG. 4, and then according to the domain name list, use a network address of an edge server corresponding to the domain name list as the network address of the local edge server. Alternatively, the SMF entity may determine the target domain name list based on step S410 and step S420 shown in FIG. 4, and then based on a mapping relationship between a domain name and a network address of an edge server, use a network address list of an edge server having a mapping relationship with the target domain name list as the network address list of the local edge server that is configured to respond to the uplink IP packet.

In an embodiment of the present disclosure, the UPF entity may also query the domain name list corresponding to the network address of the target application server according to the network address of the target application server, and then report the domain name list to the SMF entity, so as to allow the SMF entity to determine the network address of the local edge server according to the domain name list. In some embodiments, the SMF entity may determine the network address of the local edge server through steps similar to step S420 and step S430 shown in FIG. 4. Alternatively, the SMF entity may determine the target domain name list based on step S420 shown in FIG. 4, and then based on a mapping relationship between a domain name and a network address of an edge server, use a network address list of an edge server having a mapping relationship with the target domain name list as the network address list of the local edge server that is configured to respond to the uplink IP packet.

Again, referring to FIG. 3, in step S330: modify the destination address of the uplink IP packet to the network address of the local edge server based on an address translation control instruction, and forward the modified uplink IP packet to the local edge server for processing.

In an embodiment of the present disclosure, in a case of the EC architecture shown in FIG. 1, the UPF entity may receive the address translation control instruction transmitted by the SMF entity. The address translation control instruction is configured for instructing to modify the destination address of the uplink IP packet transmitted to the target application server by the user equipment to the network address of the local edge server. In addition, the address translation control instruction transmitted by the SMF entity is also configured for instructing the UPF entity to modify a source address of a downlink IP packet returned for the uplink IP packet by the local edge server to the network address of the target application server. Thus, in response to receiving the downlink IP packet (the source address of the downlink IP packet is the network address of the local edge server) returned for the uplink IP packet by the local edge server, the UPF entity may modify the source address of the downlink IP packet to the network address of the target application server, and forward the modified downlink IP packet to the user equipment. The SMF entity may transmit the address translation control instruction to the UPF entity via the N4 interface.

In an embodiment of the present disclosure, before forwarding the uplink IP packet to the local edge server for processing, translation operation may also be performed on the source port value. That is, the source port value of the uplink IP packet is modified to a preset identification value, and a correspondence between the source port value of the uplink IP packet and the preset identification value is recorded. Then, in response to receiving the downlink IP packet returned by the local edge server, if a destination port value of the downlink IP packet matches the preset identification value, the destination port value of the downlink IP packet is modified to the source port value of the uplink IP packet. This can avoid confusion between multiple concurrent connections as the user equipment makes the multiple concurrent connections.

In an embodiment of the present disclosure, in a case of the EC architecture shown in FIG. 2, namely using a new target UPF entity (i.e., the PSA2) connected to the local edge server, after the network address of the local edge server is determined, the PSA1 shown in FIG. 2 may transmit the received uplink IP packet to the PSA2 through a data channel between the PSA1 and the PSA2; or, the PSA1 may first transmit the received uplink IP packet to the SMF entity, and then the SMF entity transmits the uplink IP packet to the PSA2. After the uplink IP packet arrives at the PSA2, the PSA2 may modify the destination address of the uplink IP packet to the network address of the local edge server, and forward the modified uplink IP packet to the local edge server for processing (the PSA2 may perform the address translation processing only after receiving an address translation control instruction transmitted by the SMF entity). Under this system architecture, after the downlink IP packet returned by the local edge server arrives at the PSA2, the PSA2 modifies the source address of the downlink IP packet to the network address of the target application server, and forwards the modified downlink IP packet to the UE, with no need to pass through the PSA1.

In an embodiment of the present disclosure, in a case of the EC architecture shown in FIG. 2, namely using a new target UPF entity (i.e., the PSA2) connected to the local edge server, after the network address of the local edge server is determined, the PSA1 shown in FIG. 2 may transmit the received uplink IP packet to the UL CL through a data channel between the PSA1 and the UL CL; or, the PSA1 may first transmit the received uplink IP packet to the SMF entity, and then the SMF entity transmits the uplink IP packet to the UL CL. After the uplink IP packet arrives at the UL CL, the UL CL may modify the destination address of the uplink IP packet to the network address of the local edge server, and forward the modified uplink IP packet to the local edge server for processing via the PSA2 (the UL CL may perform the address translation processing only after receiving an address translation control instruction transmitted by the SMF entity). Under this system architecture, after the downlink IP packet returned by the local edge server arrives at the PSA2, the PSA2 forwards the downlink IP packet to the UL CL. Then, the UL CL modifies the source address of the downlink IP packet to the network address of the target application server, and forwards the modified downlink IP packet to the UE, with no need to pass through the PSA1.

Figure 5:
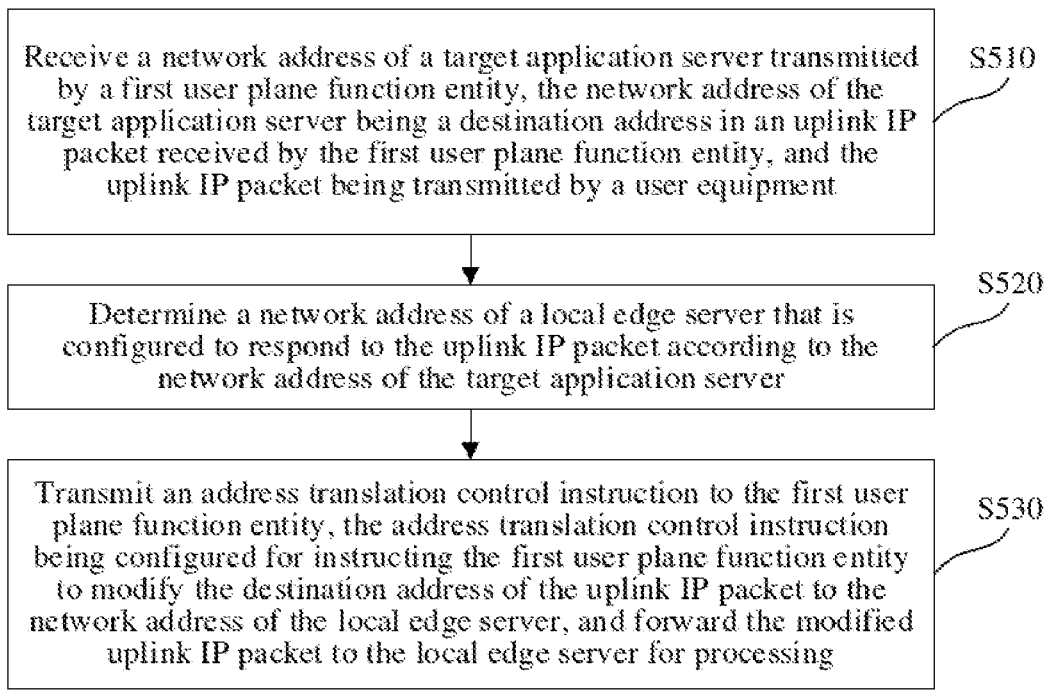
FIG. 5 is an example flowchart of a communication method based on edge computing according to an embodiment of the present disclosure.

FIG. 5 shows a flowchart of a communication method based on edge computing according to an embodiment of the present disclosure. The communication method may be executed by a SMF entity, and may be applied to the EC architecture shown in FIG. 1. Referring to FIG. 5, the communication method includes at least step S510 to step S530. A detailed description is as follows.

Step S510. The SMF entity receives a network address of a target application server transmitted by a first UPF entity. The network address of the target application server is a destination address in an uplink IP packet received by the first UPF entity. The uplink IP packet is transmitted by a user equipment.

In an embodiment of the present disclosure, the user equipment transmits a DNS request to a DNS server, and then obtains the network address of the target application server from a DNS response returned by the DNS server.

Step S520. Determine a network address of a local edge server that is configured to respond to the uplink IP packet according to the network address of the target application server.

In an embodiment of the present disclosure, the SMF entity may determine the network address of the local edge server through steps similar to step S410 to step S430 shown in FIG. 4. Alternatively, the SMF entity may, based on a mapping relationship between a network address of an application server and a network address of a local edge server, use a network address of a local edge server having the mapping relationship with the network address of the target application server as the network address of the local edge server. Alternatively, the SMF entity may determine the domain name list corresponding to the network address of the target application server based on step S410 shown in FIG. 4, and then according to the domain name list, use a network address of an edge server corresponding to the domain name list as the network address of the local edge server. Alternatively, the SMF entity may determine the target domain name list based on step S410 and step S420 shown in FIG. 4, and then based on a mapping relationship between a domain name and a network address of an edge server, use a network address list of an edge server having a mapping relationship with the target domain name list as the network address list of the local edge server that is configured to respond to the uplink IP packet.

In an embodiment of the present disclosure, if the obtained network address list of the local edge server includes a plurality of network addresses, a network address of a local edge server that is closest to the user equipment, or has a lowest communication latency with the user equipment, or has a lightest load may be selected from the plurality of network addresses, to improve the efficiency of edge communication.

Again, referring to FIG. 5, in step S530, transmit an address translation control instruction to the first UPF entity. The address translation control instruction is configured for instructing the first UPF entity to modify the destination address of the uplink IP packet to the network address of the local edge server, and forward the modified uplink IP packet to the local edge server for processing. In some embodiments of the present disclosure, the address translation control instruction is also configured for instructing the first UPF entity, in response to receiving the downlink IP packet returned for the uplink IP packet by the local edge server, to modify a source address of a downlink IP packet to the network address of the target application server, and forward the modified downlink IP packet to the user equipment.

The technical solution according to the embodiment shown in FIG. 5 is applied to the EC architecture shown in FIG. 1. The first UPF entity is the UPF (PSA) shown in FIG. 1. The address modification operations for the uplink IP packet and the downlink IP packet are both performed by the UPF entity.

Figure 6:
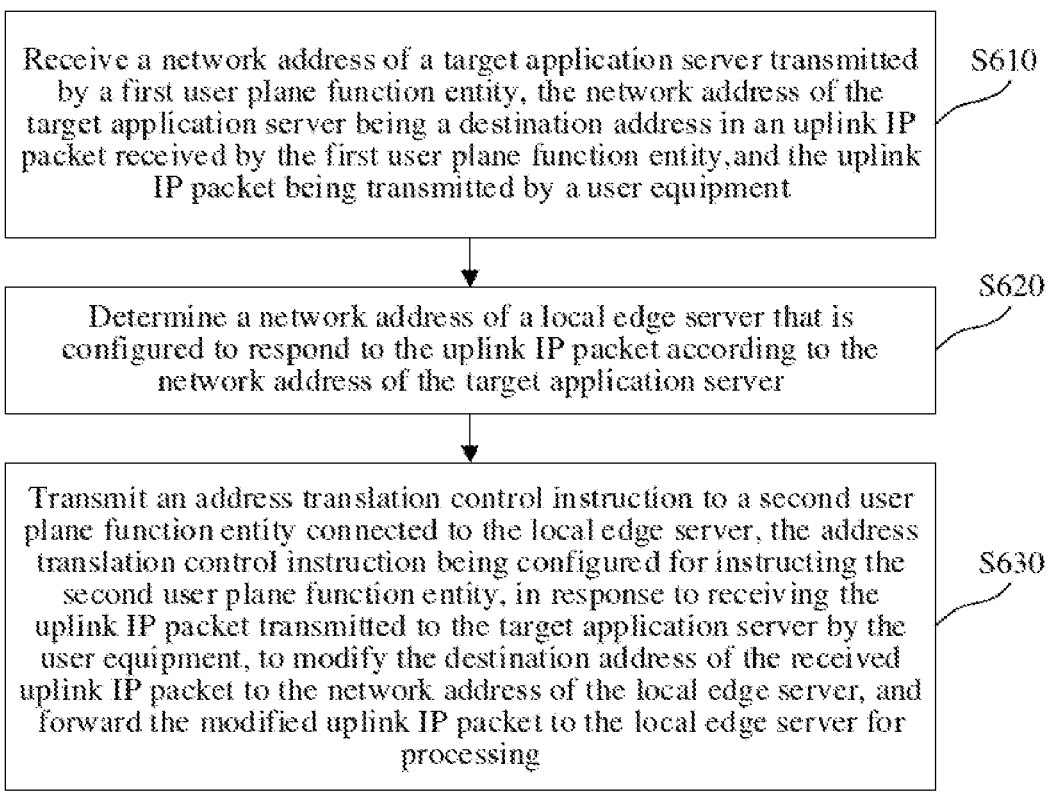
FIG. 6 is an example flowchart of a communication method based on edge computing according to an embodiment of the present disclosure.

FIG. 6 shows a flowchart of a communication method based on edge computing according to an embodiment of the present disclosure. The communication method may be performed by a SMF entity, and may be applied to the EC architecture shown in FIG. 2. Referring to FIG. 6, the communication method includes at least step S610 to step S630. A detailed description is as follows:

Step S610. Receive a network address of a target application server transmitted by a first UPF entity. The network address of the target application server is a destination address in an uplink IP packet received by the first UPF entity. The uplink IP packet is transmitted by a user equipment.

In an embodiment of the present disclosure, the user equipment transmits a DNS request to a DNS server, and then obtains the network address of the target application server from a DNS response returned by the DNS server.

Step S620. Determine a network address of a local edge server that is configured to respond to the uplink IP packet according to the network address of the target application server.

In an embodiment of the present disclosure, the SMF entity may determine the network address of the local edge server through steps similar to step S410 to step S430 shown in FIG. 4. Alternatively, the SMF entity may, based on a mapping relationship between a network address of an application server and a network address of a local edge server, use a network address of a local edge server having the mapping relationship with the network address of the target application server as the network address of the local edge server. Alternatively, the SMF entity may determine the domain name list corresponding to the network address of the target application server based on step S410 shown in FIG. 4, and then according to the domain name list, use a network address of an edge server corresponding to the domain name list as the network address of the local edge server. Alternatively, the SMF entity may determine the target domain name list based on step S410 and step S420 shown in FIG. 4, and then based on a mapping relationship between a domain name and a network address of an edge server, use a network address list of an edge server having a mapping relationship with the target domain name list as the network address list of the local edge server that is configured to respond to the uplink IP packet.

In an embodiment of the present disclosure, if the obtained network address list of the local edge server includes a plurality of network addresses, a network address of a local edge server that is closest to the user equipment, or has a lowest communication latency with the user equipment, or has a lightest load may be selected from the plurality of network addresses, to improve the efficiency of edge communication.

Step S630. Transmit an address translation control instruction to a second UPF entity connected to the local edge server. The address translation control instruction is configured for instructing the second UPF entity, in response to receiving the uplink IP packet transmitted to the target application server by the user equipment, to modify the destination address of the received uplink IP packet to the network address of the local edge server, and forward the modified uplink IP packet to the local edge server for processing. In an embodiment of the present disclosure, the address translation control instruction is also configured for instructing the second UPF entity, in response to receiving a downlink IP packet returned for the uplink IP packet by the local edge server, to modify a source address of the downlink IP packet to the network address of the target application server, and forward the modified downlink IP packet to the user equipment.

The technical solution according to the embodiment shown in FIG. 6 is applied to the EC architecture shown in FIG. 2. The first UPF entity is the PSA1 shown in FIG. 2, and the second UPF entity is the PSA2 shown in FIG. 2. In an embodiment of the present disclosure, the SMF entity may transmit an instruction message to the PSA1, to instruct the PSA1 to forward the received uplink IP packet transmitted to the target application server by the user equipment to the PSA2. Then, the PSA2 modifies the destination address of the uplink IP packet to the network address of the local edge server, and forwards the modified uplink IP packet to the local edge server for processing. In this case, after the downlink IP packet returned by the local edge server arrives at the PSA2, the PSA2 modifies the source address of the downlink IP packet to the network address of the target application server, and forwards the modified downlink IP packet to the UE, with no need to pass through the PSA1.

In an embodiment of the present disclosure, the SMF entity may also transmit an instruction message to an UL CL connected to the PSA2, to instruct the UL CL to transmit a data packet between the user equipment and the target application server to the PSA2 for forwarding processing. In this case, after the UL CL forwards the uplink IP packet transmitted by the UE to the PSA2, the PSA2 modifies the destination address of the uplink IP packet to the network address of the local edge server, and forwards the modified uplink IP packet to the local edge server for processing. After the downlink IP packet returned by the local edge server arrives at the PSA2, the PSA2 modifies the source address of the downlink IP packet to the network address of the target application server, and forwards the modified downlink IP packet to the UE, with no need to pass through the PSA1.

Figure 7:
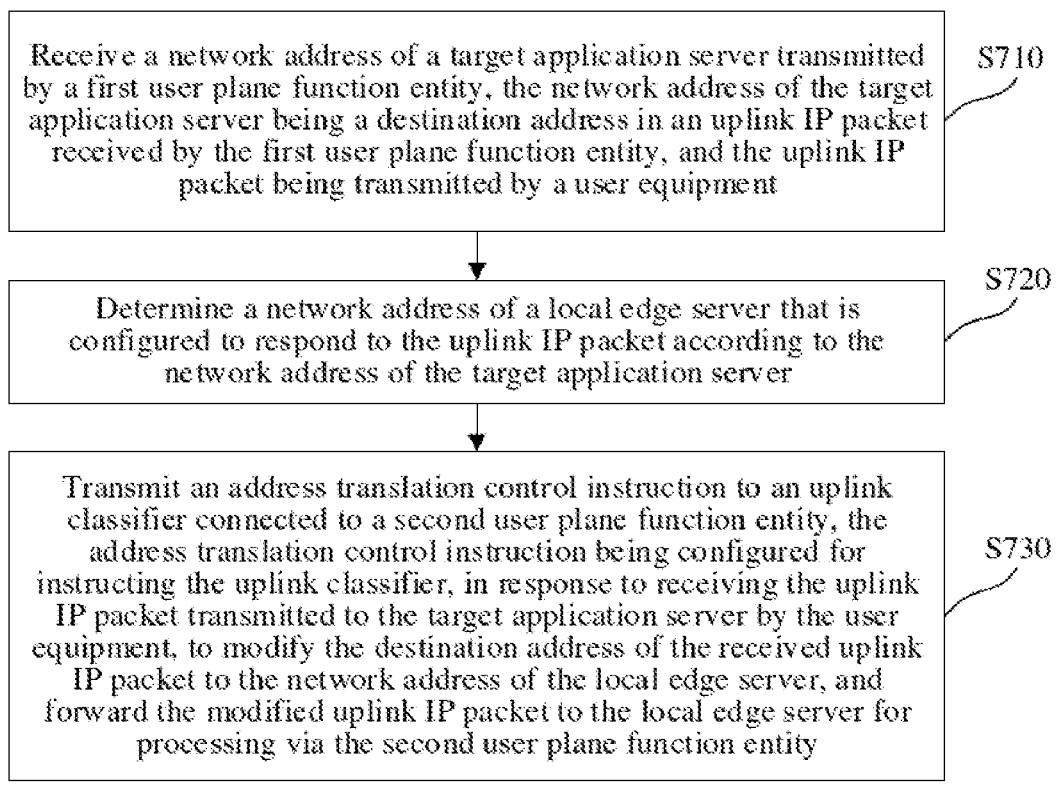
FIG. 7 is an example flowchart of a communication method based on edge computing according to an embodiment of the present disclosure.

FIG. 7 shows a flowchart of a communication method based on edge computing according to an embodiment of the present disclosure. The communication method may be executed by a SMF entity, and may be applied to the EC architecture shown in FIG. 2. Referring to FIG. 7, the communication method includes at least step S710 to step S730. A detailed description is as follows.

Step S710. Receive a network address of a target application server transmitted by a first UPF entity. The network address of the target application server is a destination address in an uplink IP packet received by the first UPF entity. The uplink IP packet is transmitted by a user equipment.

In an embodiment of the present disclosure, the user equipment transmits a DNS request to a DNS server, and then obtains the network address of the target application server from a DNS response returned by the DNS server.

Step S720. Determine a network address of a local edge server that is configured to respond to the uplink IP packet according to the network address of the target application server.

In an embodiment of the present disclosure, the SMF entity may determine the network address of the local edge server through steps similar to step S410 to step S430 shown in FIG. 4. Alternatively, the SMF entity may, based on a mapping relationship between a network address of an application server and a network address of a local edge server, use a network address of a local edge server having the mapping relationship with the network address of the target application server as the network address of the local edge server. Alternatively, the SMF entity may determine the domain name list corresponding to the network address of the target application server based on step S410 shown in FIG. 4, and then according to the domain name list, use a network address of an edge server corresponding to the domain name list as the network address of the local edge server. Alternatively, the SMF entity may determine the target domain name list based on step S410 and step S420 shown in FIG. 4, and then based on a mapping relationship between a domain name and a network address of an edge server, use a network address list of an edge server having a mapping relationship with the target domain name list as the network address list of the local edge server that is configured to respond to the uplink IP packet.

In an embodiment of the present disclosure, if the obtained network address list of the local edge server includes a plurality of network addresses, a network address of a local edge server that is closest to the user equipment, or has a lowest communication latency with the user equipment, or has a lightest load may be selected from the plurality of network addresses, to improve the efficiency of edge communication.

Step S730. Transmit an address translation control instruction to an uplink classifier connected to a second UPF entity. The address translation control instruction is configured for instructing the uplink classifier, in response to receiving the uplink IP packet transmitted to the target application server by the user equipment, to modify the destination address of the received uplink IP packet to the network address of the local edge server, and forward the modified uplink IP packet to the local edge server for processing via the second UPF entity. In an embodiment of the present disclosure, the address translation control instruction is also configured for instructing the uplink classifier, in response to receiving a downlink IP packet returned for the uplink IP packet by the local edge server, to modify a source address of the downlink IP packet to the network address of the target application server, and forward the modified downlink IP packet to the user equipment.

The technical solution according to the embodiment shown in FIG. 7 is applied to the EC architecture shown in FIG. 2. The first UPF entity is the PSA1 shown in FIG. 2, the second UPF entity is the PSA2 shown in FIG. 2, and the uplink classifier is the UL CL shown in FIG. 2. In an embodiment of the present disclosure, the SMF entity may transmit an instruction message to the PSA1, to instruct the PSA1 to forward the received uplink IP packet transmitted to the target application server by the user equipment to the UL CL. Then, the UL CL modifies the destination address of the uplink IP packet to the network address of the local edge server, and forwards the modified uplink IP packet to the local edge server for processing via the PSA2. In this case, after the downlink IP packet returned by the local edge server arrives at the PSA2, the PSA2 forwards the downlink IP packet to the UL CL. Then, the UL CL modifies the source address of the downlink IP packet to the network address of the target application server, and forwards the modified downlink IP packet to the UE, with no need to pass through the PSA1.

In an embodiment of the present disclosure, the SMF entity may also transmit an instruction message to the UL CL, to instruct the UL CL to transmit a data packet between the user equipment and the target application server to the PSA2 for forwarding processing. In this case, after the UL CL receives the uplink IP packet transmitted by the UE, the UL CL modifies the destination address of the uplink IP packet to the network address of the local edge server, and forwards the modified uplink IP packet to the PSA2, to allow the PSA2 to forward the modified uplink IP packet to the local edge server for processing. After the downlink IP packet returned by the local edge server arrives at the PSA2, the PSA2 forwards the downlink IP packet to the UL CL. Then, the UL CL modifies the source address of the downlink IP packet to the network address of the target application server, and forwards the modified downlink IP packet to the UE, with no need to pass through the PSA1.

The foregoing embodiments describe the technical solutions according to the embodiments of the present disclosure respectively from perspectives of the UPF entity and the SMF entity. The following describes in detail technical solutions according to embodiments of the present disclosure from a perspective of interactions between each entity with reference to FIG. 8 to FIG. 11.

Figure 8:
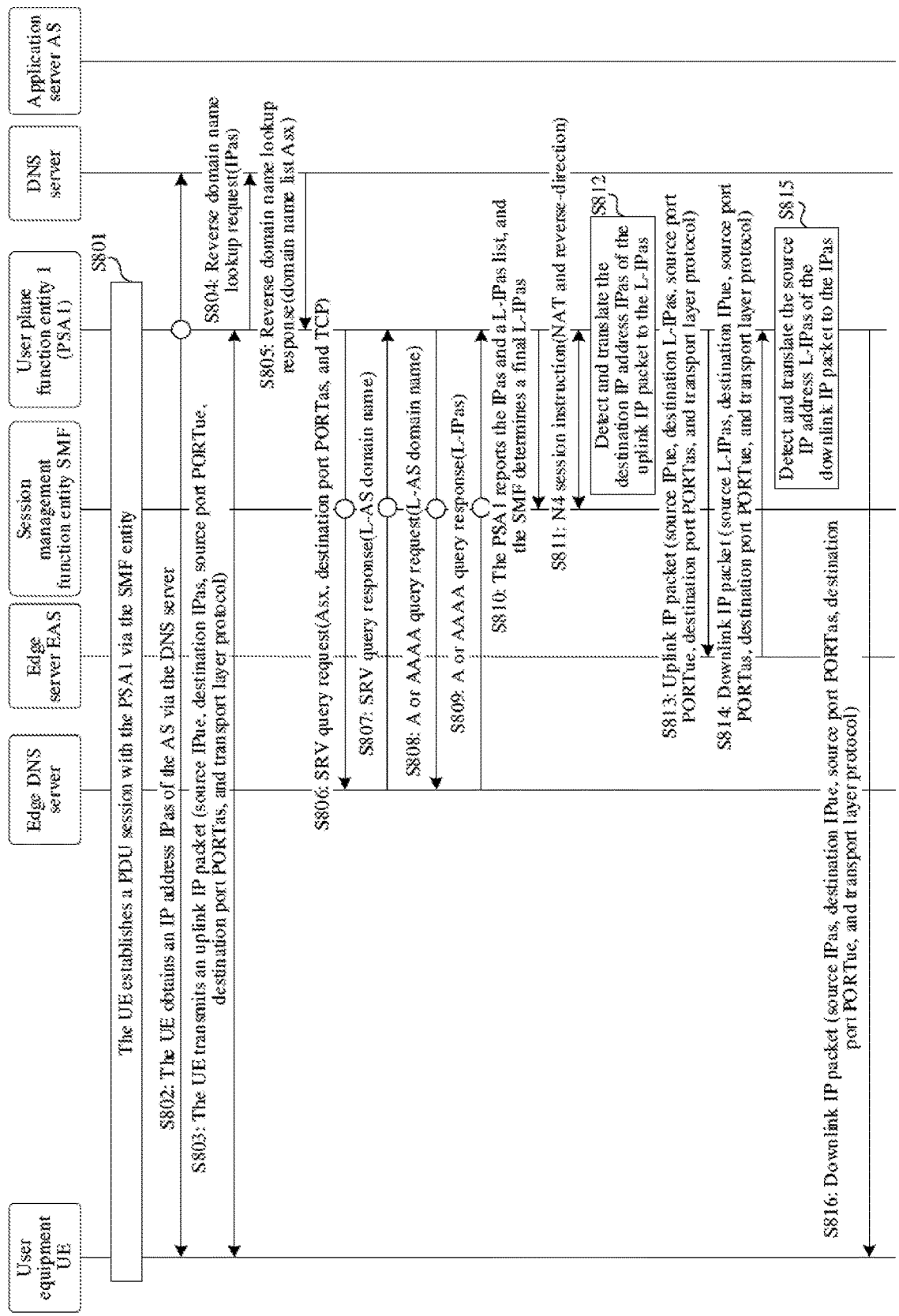
FIG. 8 is an example flowchart of a communication method based on edge computing according to an embodiment of the present disclosure.

In an embodiment of the present disclosure, based on the EC architecture shown in FIG. 1, the communication method based on edge computing according to the embodiment of the present disclosure, as shown in FIG. 8, includes the following steps:

Step S801. The UE establishes a PDU session with the PSA1 via the SMF.

In this step, after the UE establishes the PDU session with the PSA1 via the SMF, a network allocates an IP address to the UE. A process of the UE initiating establishment of the PDU session may refer to section 4.3.2 of the TS23.502 protocol of the 3rd Generation Partnership Project (3GPP). During the establishment of the PDU session, the SMF instructs the PSA1 to query an address of a local edge server that is used to replace a destination IP address of the uplink IP packet.

Step S802. The UE obtains an IP address IPas of the AS via the DNS server.

In actual implementation, the UE may transmit a DNS request. After the DNS request uplink IP packet arrives at the PSA1, the PSA1 forwards this uplink IP packet to a target IP address, namely the DNS server. After a DNS response downlink IP packet fed back by the DNS server arrives at the PSA1, the PSA1 determines the UE according to a destination address of the downlink IP packet, and then forwards the DNS response downlink IP packet to the UE, so that the UE can obtain the IP address IPas of the AS from the DNS response downlink IP packet. In some embodiments, the DNS request may be based on the UDP, the HTTPS protocol, or the TLS protocol.

Step S803. The UE transmits an uplink IP packet (source IPue, destination IPas, source port PORTue, destination port PORTas, and transport layer protocol (such as the TCP)) to the PSA1.

Step S804. The PSA1 transmits a reverse domain name lookup request to the DNS server.

According to the instruction in step S801 that the SMF instructs the PSA1 to query the address of the local edge server that is used to replace the destination IP address of the uplink IP packet, the PSA1 transmits the reverse domain name lookup request to the DNS server. The reverse domain name lookup request includes the destination address of the uplink IP packet, namely the IP address IPas of the AS.

Step S805. The DNS server returns a reverse domain name lookup response to the PSA1. The reverse domain name lookup response includes a domain name list Asx.

Step S806. The PSA1 transmits a SRV query request to the edge DNS server.

In actual implementation, for each item A in the domain name list Asx, the PSA1 respectively transmits a SRV query request to the edge DNS server. The SRV query request includes the domain name A, the destination port PORTas, and the transport layer protocol used by the uplink IP packet (the transport layer protocol is obtained from the protocol field in the uplink IP packet header, such as the TCP).

Step S807. The edge DNS server returns a SRV query response to the PSA1.

The edge DNS server returns the SRV query response for each item A to the PSA1. The SRV query response includes the domain name (L-AS domain name) of the local edge server.

In accordance with step S806 and step S807, a complete domain name is obtained according to each item in the domain name list Asx, the transport layer protocol used by the uplink IP packet, and the destination port number of the uplink IP packet. That is, the PSA1 needs to transmit the SRV query request to the edge DNS server for each item A in the domain name list Asx, and the edge DNS server feeds back the SRV query response for the SRV query request of each item A. The SRV query is performed for each item in the domain name list Asx. If a plurality of complete domain names have been queried, a domain name list (L-AS domain name list) including the plurality of complete domain names may be obtained. Some items may have query results of no corresponding domain names of the local edge server.

Step S808. The PSA1 transmits an A or AAAA query request to the edge DNS server.

The PSA1 transmits the A or AAAA query request including the L-AS domain name (if a plurality of L-AS domain names form a L-AS domain name list, the same operation needs to be performed on each L-AS domain name in the L-AS domain name list) to the edge DNS server. If the IPue and the IPas are IPv4, the A query request is initiated; and if the IPue and the IPas are IPv6, the AAAA query request is initiated.

Step S809. The edge DNS server returns an A or AAAA query response to the PSA1.

The edge DNS server returns the A or AAAA query response including the IP address (namely the L-IPas) of the local edge server to the PSA1. If a plurality of IP addresses of the local edge server have been queried, the A or AAAA query response may include an IP address list (L-IPas list). The plurality of L-IPases may be obtained by respectively querying each item in the domain name list.

Step S806 to step S809 may be implemented by the PSA1 directly interacting with the edge DNS server, or may be implemented by the PSA1 interacting with the edge DNS server via the SMF (that is, the SMF is responsible for forwarding).

Step S810. The PSA1 reports the IPas and the L-IPas list, and the SMF determines a final L-IPas.

The PSA1 reports the destination IP address IPas and the queried L-IPases (if one L-IPas has been queried, the one L-IPas needs to be reported) to the SMF via the N4 interface, so as to allow the SMF to select the L-IPas that is closest to the UE, or has the lowest communication latency with the UE, or has the lightest load from the queried L-IPases.

Step S811. The SMF transmits a N4 session instruction to the PSA1.

In this step, the SMF transmits the N4 session instruction to the PSA1, to make the PSA1 to perform NAT on the destination IP address and data forwarding operation, namely detecting and replacing the destination IP address IPas of the uplink IP packet of the UE with the L-IPas, and continuing the uplink forwarding; in addition, detecting and replacing the source IP address L-IPas of the downlink IP packet of the UE with the IPas, and continuing the downlink forwarding.

Step S812. The PSA1 detects and translates the destination IP address IPas of the uplink IP packet transmitted by the UE to the L-IPas according to the instruction of the SMF.

Step S813. The PSA1 transmits the uplink IP packet (source IPue, destination L-IPas, source port PORTue, destination port PORTas, and transport layer protocol) to the edge server EAS.

In actual implementation, according to the instruction of the SMF, the PSA1 transmits the uplink IP packet (source IPue, destination L-IPas, source port PORTue, destination port PORTas, and transport layer protocol) whose destination IP address has been translated to the edge server EAS via the N6 interface.

Step S814. The EAS returns a downlink IP packet (source L-IPas, destination IPue, source port PORTas, destination port PORTue, and transport layer protocol) to the PSA1 for the uplink IP packet.

Step S815. The PSA1 detects and translates the source IP address L-IPas in the downlink IP packet to the IPas according to the instruction of the SMF.

Step S816. The PSA1 transmits the downlink IP packet (source IPas, destination IPue, source port PORTas, destination port PORTue, and transport layer protocol) to the UE.

The PSA1 transmits the downlink IP packet (source IPas, destination IPue, source port PORTas, destination port PORTue, and transport layer protocol) whose source IP address has been translated to the UE according to the instruction of the SMF.

Step S812 and step S815 are not merely used to perform address translation on the uplink IP packet received in step S803, but also to perform address translation processing on all subsequent data packets between the UE and the AS. In addition, step S812 may further include translating the source port PORTue. Accordingly, the source port value PORTue and the destination IP address IPas in the uplink IP packet after the detection and translation are both changed.

In this case, the reverse NAT in step S815 includes detecting and translating the destination port and the source L-IPas in the downlink IP packet to the PORTue and the IPas.

In actual implementation, after the uplink IP packet (source IPue, destination IPas, source port PORTue, destination port PORTas, and transport layer protocol) transmitted by the UE arrives at the PSA1, the PSA1 detects that the destination IP of the uplink IP packet is the IPas, translates the destination IP address IPas of the uplink IP packet to the L-IPas and the source port value PORTue to the preset identification value (such as PortIDValue1), and then transmits the translated uplink IP packet (source IPue, destination L-IPas, source port PortIDValue1, destination port PORTas, and transport layer protocol) to the edge server EAS via the N6 interface. After the PSA1 receives the downlink IP packet (source L-IPas, destination IPue, source port PORTas, destination port PortIDValue1, and transport layer protocol) returned by the EAS, the PSA1 detects that the destination port value of the downlink IP packet is the PortIDValue1 and the destination IP is the IPue, translates the destination port value of the downlink IP packet to the PORTue and the source IP address L-IPas of the downlink IP packet to the IPas, and then transmits the translated downlink IP packet (source IPas, destination IPue, source port PORTas, destination Port PORTue, and transport layer protocol) to the UE.

In the embodiment, as shown in FIG. 8, the process of obtaining the IP address L-IPas of the local edge server is implemented through step S804 to step S810. In other embodiments of the present disclosure, the process may be implemented by means of configuration. For example, step S900 shown in FIG. 9 replaces step S804 to step S810 shown in FIG. 8. Step S900 includes the following:

Step S9001. The PSA1 transmits a N4 session report to the SMF.

In actual implementation, the PSA1 transmits the N4 session report to the SMF, to report the destination address IPas included in the uplink IP packet.

Step S9002. The SMF detects and maps the destination address IPas to the IP address L-IPas of the EAS according to configuration information.

In actual implementation, the SMF may directly map the IPas to the L-IPas according to the configuration information on the SMF. Alternatively, the SMF may perform a query process similar to that in step S804 and step S805 shown in FIG. 8, and then obtain the L-IPas by means of mapping according to the configuration information on the SMF. Alternatively, the SMF may perform a query process similar to that in step S804 to step S807 shown in FIG. 8, and then obtain the L-IPas by means of mapping according to the configuration information on the SMF. The SMF may perform a query process similar to that in step S804 to step S809 shown in FIG. 8 to obtain the L-IPas.

Figure 10:
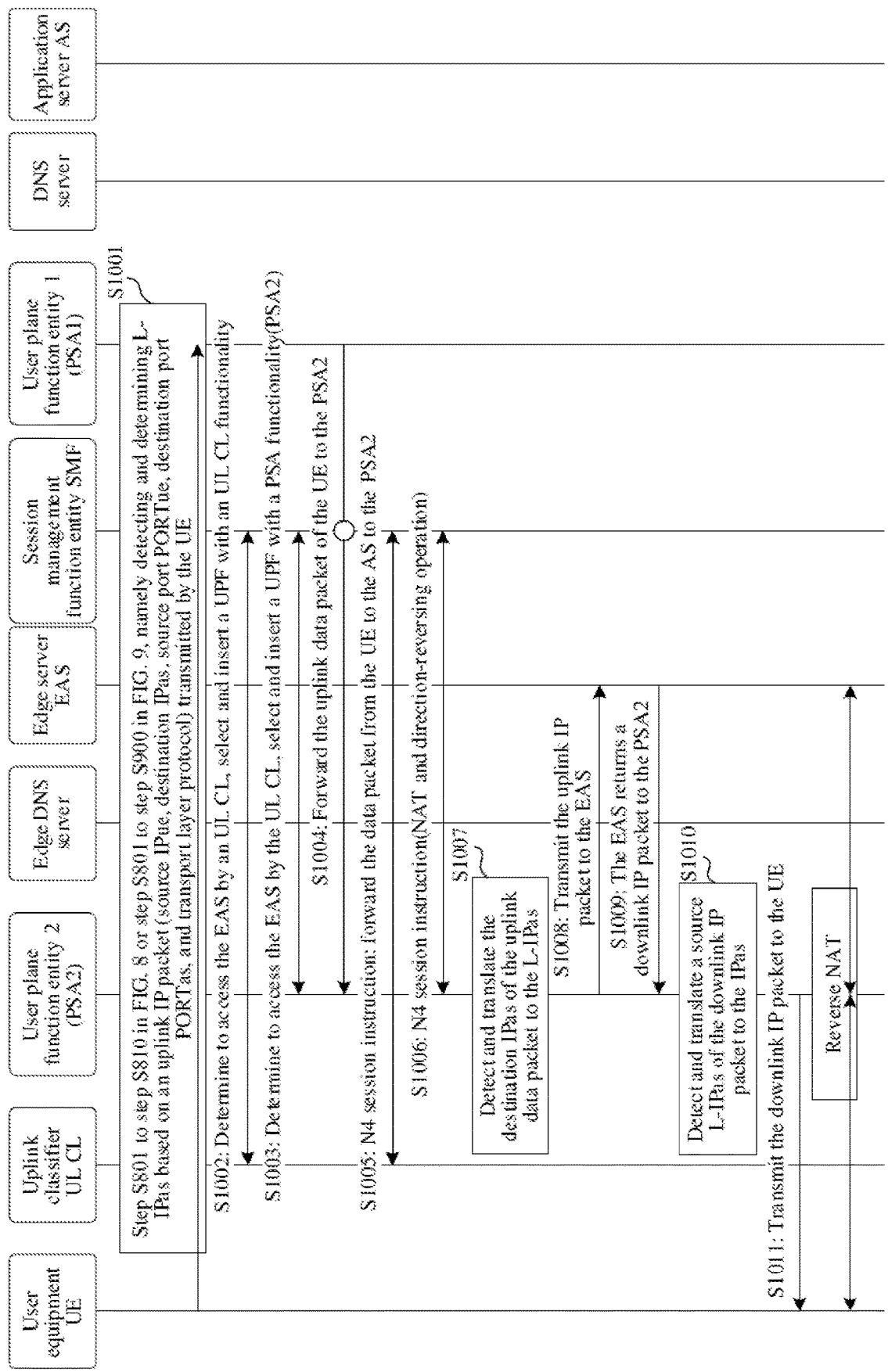
FIG. 10 is an example flowchart of a communication method based on edge computing according to an embodiment of the present disclosure.

In an embodiment of the present disclosure, based on the EC architecture shown in FIG. 2, the communication method based on edge computing according to the embodiment of the present disclosure, as shown in FIG. 10, includes the following steps:

Step S1001. This step includes step S801 to step S810 shown in FIG. 8 or step S801 to step S900 shown in FIG. 9, namely detecting and determining the L-IPas based on the uplink IP packet (source IPue, destination IPas, source port PORTue, destination port PORTas, and transport layer protocol) transmitted by the UE.

Step S1002. Determine to access the EAS by an UL CL, select and insert a UPF with an UL CL functionality.

In actual implementation, the SMF determines to access the EAS by the UL CL according to the determined L-IPas address, selects and inserts the UPF with an UL CL functionality.

Step S1003. Determine to access the EAS by the UL CL, select and insert a UPF with a PSA functionality, namely the PSA2.

The SMF determines to access the EAS by the UL CL according to the determined L-IPas address, selects and inserts the UPF with a PSA functionality, namely the PSA2.

A detailed process of step S1002 and step S1003 may refer to section 4.3.5.4 Addition of additional PDU Session Anchor and Branching Point or UL CL in 3GPP standard TS23.502.

Step S1004. The PSA1 forwards the uplink IP packet of the UE to the PSA2.

Step S1004 implements data forwarding of the uplink IP packet that is transmitted by the UE to the AS and cached on the PSA1 to the PSA2. Herein, the data forwarding includes two mechanisms. One is to establish a data forwarding tunnel between the PSA1 and the PSA2, namely the PSA1 directly transmitting data to the PSA2. The other one is to establish two data forwarding tunnels respectively between the PSA1 and the SMF, and between the SMF and the PSA2, namely the PSA1 forwarding data to the SMF, and then the SMF forwarding the data to the PSA2. The data cached on the PSA1 may be one IP data packet or a plurality of IP data packets.

Step S1005. The SMF transmits a N4 session instruction to the UL CL, to allow the UL CL to forward the data packet from the UE to the AS to the PSA2 in an uplink direction.

Step S1006. The SMF transmits a N4 session instruction to the PSA2, to allow the PSA2 to perform the NAT and direction-reversing operation.

In this step, the destination IP address IPas of the uplink IP packet of the UE is detected and replaced with the L-IPas, and the uplink forwarding is continued; in addition, the source IP address L-IPas of the downlink IP packet of the UE is detected and replaced with the IPas, and the downlink forwarding is continued.

Step S1007. Detect and translate the destination IP address IPas of the uplink IP packet to the L-IPas.

In actual implementation, the PSA2 detects and translates the destination IP address IPas of the uplink IP packet to the L-IPas according to the instruction of the SMF.

Step S1008. Transmit the uplink IP packet to the EAS.

In actual implementation, the PSA2 transmits the uplink IP packet (source IPue, destination L-IPas, source port PORTue, destination port PORTas, and transport layer protocol) whose destination IP address has been translated to the EAS according to the instruction of the SMF.

Step S1009. The EAS returns a downlink IP packet to the PSA2.

In actual implementation, the EAS returns the downlink IP packet (source L-IPas, destination IPue, source port PORTas, destination port PORTue, and transport layer protocol) to the PSA2 for the uplink IP packet.

Step S1010. Detect and translate the source IP address L-IPas of the downlink IP packet to the IPas.

In this step, the PSA2 detects and translates the source IP address L-IPas of the downlink IP packet to the IPas according to the instruction of the SMF.

Step S1011. Transmit the downlink IP packet to the UE.

In actual implementation, the PSA2 transmits the downlink IP packet (source IPas, destination IPue, source port PORTas, destination port PORTue, and transport layer protocol) whose source IP address has been translated to the UE according to the instruction of the SMF.

In addition, the PSA2 subsequently performs reverse NAT operation between the UE and EAS. That is, the PSA2 detects and translates the destination IP address IPas of the uplink IP packet transmitted by the UE to the AS to the L-IPas, then transmits the translated uplink IP packet to the EAS; in addition, detects and translates the source IP address L-IPas of the downlink IP packet fed back by the EAS to the IPas, then transmits the translated downlink IP packet to the UE.

In addition, in an embodiment similar to that as shown in FIG. 8, when performing the address translation on the uplink IP packet, the source port PORTue may also be translated. Accordingly, the source port value PORTue and the destination IP address IPas in the uplink IP packet after the detection and translation are both changed. In this case, the operation of detecting and performing reverse NAT on the downlink IP packet includes translating the destination port and the source L-IPas addresses in the downlink IP packet to the PORTue and the IPas.

Figure 11:
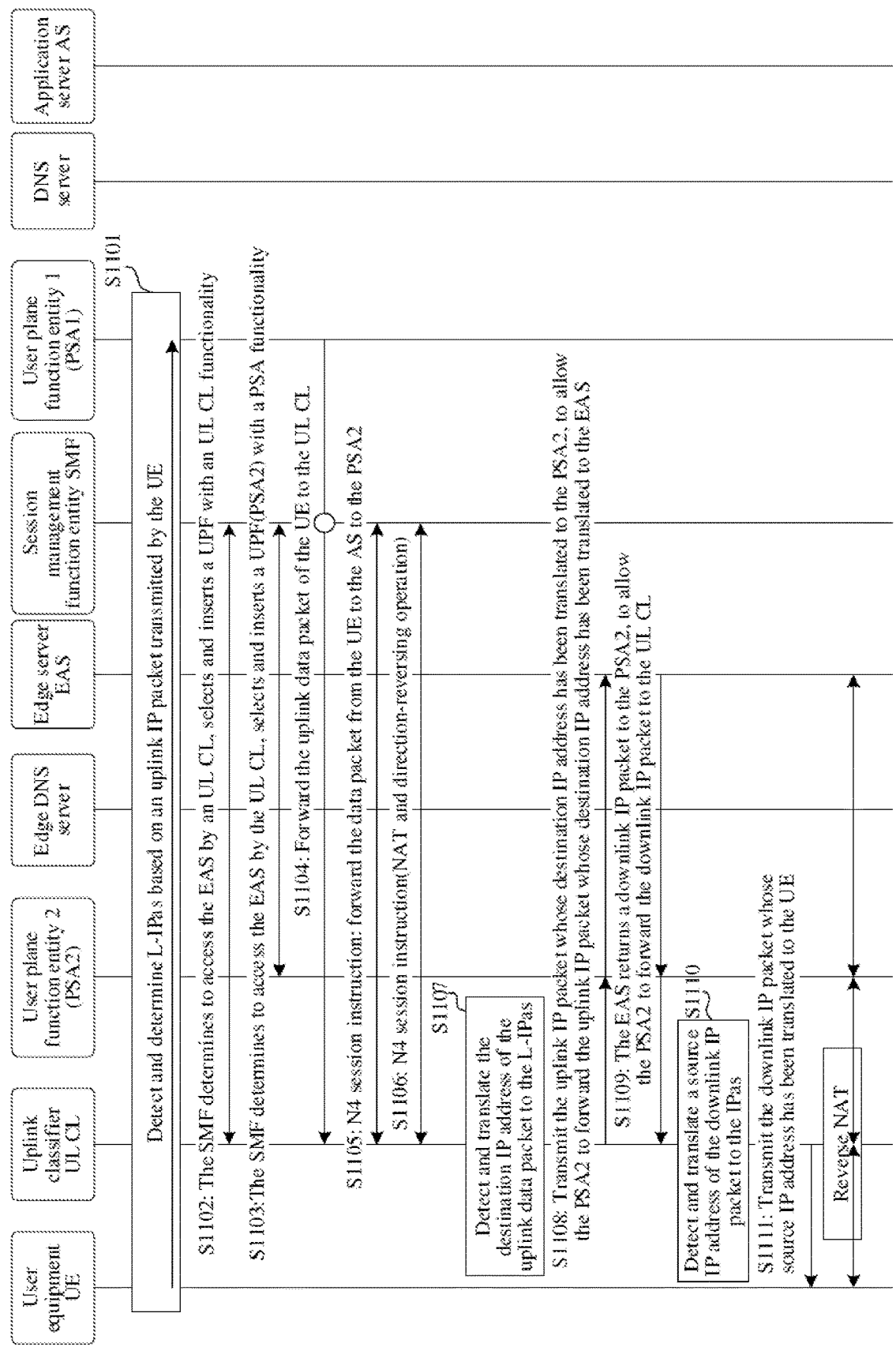
FIG. 11 is an example flowchart of a communication method based on edge computing according to an embodiment of the present disclosure.

In an embodiment of the present disclosure, based on the EC architecture shown in FIG. 2, the communication method based on edge computing according to the embodiment of the present disclosure, as shown in FIG. 11, includes the following steps:

Step S1101. Detect and determine a L-IPas based on an uplink IP packet transmitted by the UE.

Figure 9:
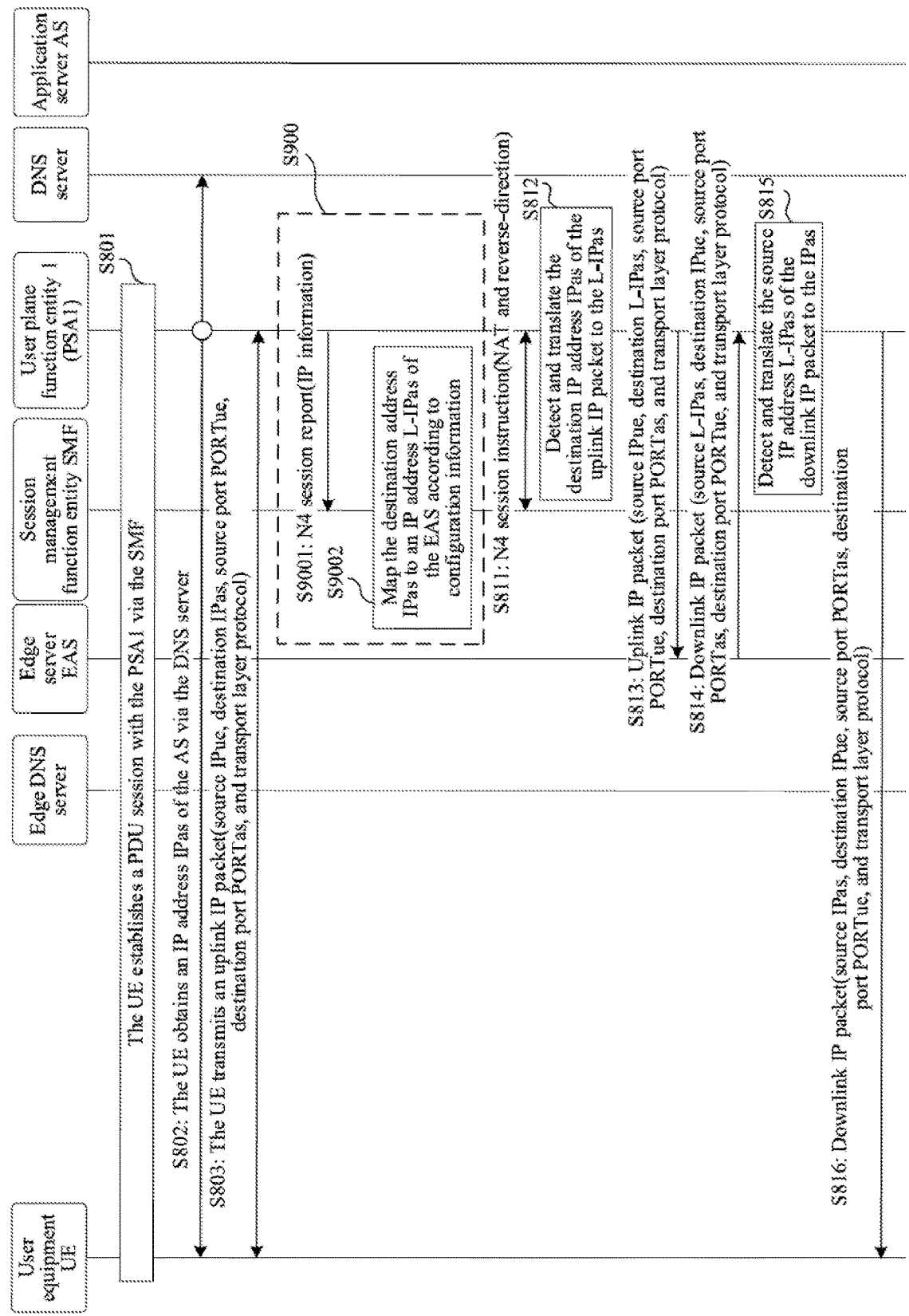
FIG. 9 is an example flowchart of a communication method based on edge computing according to an embodiment of the present disclosure.

Step S1101 includes step S801 to step S810 shown in FIG. 8 or step S801 to step S900 shown in FIG. 9, namely detecting and determining the L-IPas based on the uplink IP packet (source IPue, destination IPas, source port PORTue, destination port PORTas, and transport layer protocol) transmitted by the UE.

Step S1102. The SMF determines to access the EAS by an UL CL, selects and inserts a UPF with an UL CL functionality.

The SMF determines to access the EAS by the UL CL, selects and inserts the UPF with an UL CL functionality.

Step S1103. The SMF determines to access the EAS by the UL CL, selects and inserts a UPF (PSA2) with a PSA functionality.

The SMF determines to access the EAS by the UL CL according to the determined L-IPas address, selects and inserts the UPF with a PSA functionality, namely the PSA2.

A detailed process of step S1102 and step S1103 may refer to section 4.3.5.4 Addition of additional PDU Session Anchor and Branching Point or UL CL in 3GPP standard TS23.502.

Step S1104. The PSA1 forwards the uplink IP packet of the UE to the UL CL.

Step S1104 implements data forwarding of the uplink IP packet that is transmitted by the UE to the AS and cached on the PSA1 to the UL CL. Herein, the data forwarding includes two mechanisms. One is to establish a data forwarding tunnel between the PSA1 and the UL CL, namely the PSA1 directly transmitting data to the UL CL. The other one is to establish two data forwarding tunnels respectively between the PSA1 and the SMF, and between the SMF and the UL CL, namely the PSA1 forwarding data to the SMF, and then the SMF forwarding the data to the UL CL. The data cached on the PSA1 may be one IP data packet or a plurality of IP data packets.

Step S1105. The SMF transmits a N4 session instruction to the UL CL, to allow the UL CL to forward the data packet from the UE to the AS to the PSA2.

Step S1106. The SMF transmits a N4 session instruction to the UL CL, to allow the UL CL to perform NAT and direction-reversing operation.

That is, the destination IP address IPas of the uplink IP packet of the UE is detected and replaced with the L-IPas, and the uplink forwarding is continued; in addition, the source IP address L-IPas of the downlink IP packet of the UE is detected and replaced with the IPas, and the downlink forwarding is continued.

Step S1107. Detect and translate the destination IP address IPas of the uplink IP packet to the L-IPas.

The UL CL detects and translates the destination IP address IPas of the uplink IP packet to the L-IPas according to the instruction of the SMF.

Step S1108. Transmit the uplink IP packet whose destination IP address has been translated to the PSA2, to allow the PSA2 to forward the uplink IP packet whose destination IP address has been translated to the EAS.

The UL CL transmits the uplink IP packet (source IPue, destination L-IPas, source port PORTue, destination port PORTas, and transport layer protocol) whose destination IP address has been translated to the PSA2 according to the instruction of the SMF, to allow the PSA2 to forward the uplink IP packet whose destination IP address has been translated to the EAS.

Step S1109. The EAS returns a downlink IP packet to the PSA2, to allow the PSA2 to forward the downlink IP packet to the UL CL.

The EAS returns the downlink IP packet (source L-IPas, destination IPue, source port PORTas, destination port PORTue, and transport layer protocol) to the PSA2 for the uplink IP packet, and the downlink IP packet is forwarded by the PSA2 to the UL CL.

Step S1110. Detect and translate the source IP address L-IPas of the downlink IP packet to the IPas.

The UL CL detects and translates the source IP address L-IPas of the downlink IP packet to the IPas according to the instruction of the SMF.

Step S1111. Transmit the downlink IP packet whose source IP address has been translated to the UE.

The UL CL transmits the downlink IP packet (source IPas, destination IPue, source port PORTas, destination port PORTue, and transport layer protocol) whose source IP address has been translated to the UE according to the instruction of the SMF.

In addition, the UL CL subsequently performs reverse NAT between the UE and EAS. That is, the UL CL detects and translates the destination IP address IPas in the uplink IP packet transmitted by the UE to the AS to the L-IPas, and then transmits the translated uplink IP packet to the PSA2, to allow the PSA2 to forward the translated uplink IP packet to the EAS; in addition, the UL CL detects and translates the source IP address L-IPas in the downlink IP packet that is fed back by the EAS and forwarded by the PSA2 to the IPas, and then transmits the translated downlink IP packet to the UE.

In addition, in an embodiment similar to that as shown in FIG. 8, when performing the address translation on the uplink IP packet, the source port PORTue may also be translated. Accordingly, the source port value PORTue and the destination IP address IPas in the uplink IP packet after the detection and translation are both changed. In this case, the operation of detecting and performing reverse NAT on the downlink IP packet includes translating the destination port and the source IP address L-IPas in the downlink IP packet to the PORTue and the IPas.

The technical solutions of the foregoing embodiments of the present disclosure are applied to the two EC architectures shown in FIG. 1 and FIG. 2. Regardless of whether the IP address of the UE is IPv4 or IPv6, the access of the UE to the EAS can be realized with no need to modify or enhance the UE and the AS. This makes the EC to have an important application value, which will be widely used in services such as game acceleration, video acceleration, and vehicle to everything (V2X).

The following describes apparatus embodiments of the present disclosure, which may be used for performing the communication method based on edge computing in the foregoing embodiments of the present disclosure. For details not disclosed in the apparatus embodiments of the present disclosure, reference may be made to the foregoing embodiments of the communication method based on edge computing of the present disclosure.

Figure 12:
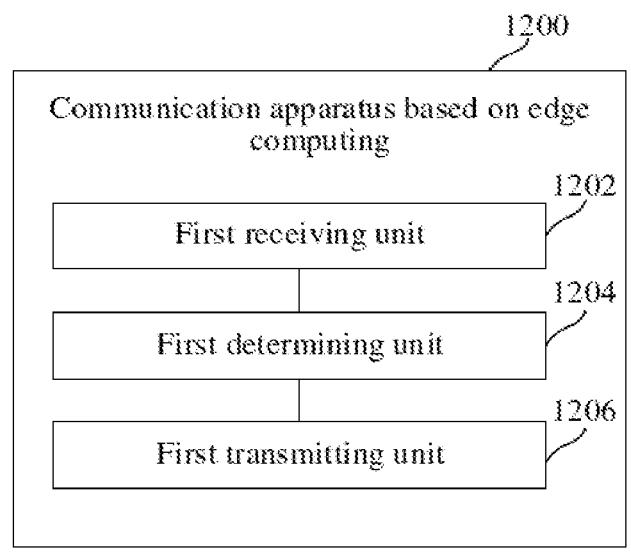
FIG. 12 is an example block diagram of a communication apparatus based on edge computing according to an embodiment of the present disclosure.

FIG. 12 show a block diagram of a communication apparatus based on edge computing according to an embodiment of the present disclosure. The communication apparatus may be provided inside the UPF entity.

Referring to FIG. 12, the communication apparatus 1200 based on edge computing according to the embodiment of the present disclosure includes: a first receiving unit 1202, a first determining unit 1204, and a first transmitting unit 1206.

The first receiving unit 1202 is configured to receive an uplink IP packet transmitted by a user equipment, and a destination address of the uplink IP packet being a network address of a target application server. The first determining unit 1204 is configured to determine a network address of a local edge server that is configured to respond to the uplink IP packet according to the network address of the target application server. The first transmitting unit 1206 is configured to modify the destination address of the uplink IP packet to the network address of the local edge server, and forward the modified uplink IP packet to the local edge server for processing.

In some embodiments of the present disclosure, the first determining unit 1204 is configured to: query a domain name list corresponding to the network address of the target application server according to the network address of the target application server; query to obtain a corresponding target domain name list according to the domain name list, a transport layer protocol used by the uplink IP packet, and a destination port included in the uplink IP packet; and query to obtain a network address list of the local edge server based on the target domain name list, and obtain the network address of the local edge server that is configured to respond to the uplink IP packet based on the network address list.

In some embodiments of the present disclosure, the first determining unit 1204 is configured to: initiate an SRV query to an edge DNS server according to the domain name list, the transport layer protocol used by the uplink IP packet, and the destination port, to obtain the target domain name list; and query to obtain the network address list of the local edge server from the edge DNS server based on the target domain name list.

In some embodiments of the present disclosure, the first determining unit 1204 is configured to: report the network address list and the network address of the target application server to a session management function entity, to allow the session management function entity to select a network address of a local edge server that is configured to respond to the uplink IP packet from the network address list from the network address list.

In some embodiments of the present disclosure, the first determining unit 1204 is configured to: report the network address of the target application server to a session management function entity, to allow the session management function entity to determine the network address of the local edge server according to the network address of the target application server; or query a domain name list corresponding to the network address of the target application server according to the network address of the target application server, and report the domain name list to the session management function entity, to allow the session management function entity to determine the network address of the local edge server according to the domain name list.

In some embodiments of the present disclosure, the first receiving unit 1202 is further configured to: receive an address translation control instruction transmitted by a session management function entity. The address translation control instruction is configured for instructing to modify the destination address of the uplink IP packet transmitted to the target application server by the user equipment to the network address of the local edge server.

In some embodiments of the present disclosure, the address translation control instruction is further configured for instructing to modify a source address of a downlink IP packet returned for the uplink IP packet by the local edge server to the network address of the target application server. The first receiving unit 1202 is further configured to: receive the downlink IP packet returned for the uplink IP packet by the local edge server, the source address of the downlink IP packet being the network address of the local edge server. The first transmitting unit 1206 is further configured to: modify the source address of the downlink IP packet to the network address of the target application server, and forward the modified downlink IP packet to the user equipment.

In some embodiments of the present disclosure, the first transmitting unit 1206 is further configured to: before forwarding the modified uplink IP packet to the local edge server for processing, modify a source port value of the uplink IP packet to a preset identification value, and record a correspondence between the source port value of the uplink IP packet and the preset identification value; and in response to receiving a downlink IP packet returned by the local edge server, modify a destination port value of the downlink IP packet to the source port value of the uplink IP packet when the destination port value of the downlink IP packet matches the preset identification value.

In some embodiments of the present disclosure, in when a new target user plane function entity connected to the local edge server is used, the first transmitting unit 1206 is configured to: transmit the uplink IP packet directly to the target user plane function entity, to allow the target user plane function entity to modify the destination address of the uplink IP packet to the network address of the local edge server, and forward the modified uplink IP packet to the local edge server for processing; or transmit the uplink IP packet to the target user plane function entity via a session management function entity, to allow the target user plane function entity to modify the destination address of the uplink IP packet to the network address of the local edge server, and forward the modified uplink IP packet to the local edge server for processing.

In some embodiments of the present disclosure, when a new target user plane function entity connected to the local edge server is used, the first transmitting unit 1206 is configured to: transmit the uplink IP packet directly to an uplink classifier, to allow the uplink classifier to modify the destination address of the uplink IP packet to the network address of the local edge server, and forward the modified uplink IP packet to the local edge server for processing via the target user plane function entity connected to the local edge server; or transmit the uplink IP packet to an uplink classifier via a session management function entity, to allow the uplink classifier to modify the destination address of the uplink IP packet to the network address of the local edge server, and forward the modified uplink IP packet to the local edge server for processing via the target user plane function entity connected to the local edge server.

Figure 13:
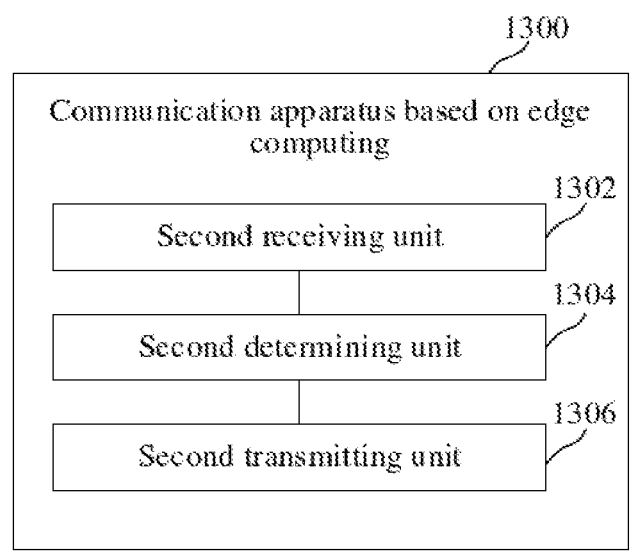
FIG. 13 is an example block diagram of a communication apparatus based on edge computing according to an embodiment of the present disclosure.

FIG. 13 show a block diagram of a communication apparatus based on edge computing according to an embodiment of the present disclosure. The communication apparatus may be provided inside the SMF entity.

Referring to FIG. 13, the communication apparatus 1300 based on edge computing according to the embodiment of the present disclosure includes: a second receiving unit 1302, a second determining unit 1304, and a second transmitting unit 1306.

The second receiving unit 1302 is configured to receive a network address of a target application server transmitted by a first user plane function entity, the network address of the target application server being a destination address in an uplink IP packet received by the first user plane function entity, and the uplink IP packet being transmitted by a user equipment. The second determining unit 1304 is configured to determine a network address of a local edge server that is configured to respond to the uplink IP packet according to the network address of the target application server. The second transmitting unit 1306 is configured to transmit an address translation control instruction to the first user plane function entity, the address translation control instruction being configured for instructing the first user plane function entity to modify the destination address of the uplink IP packet to the network address of the local edge server, and forward the modified uplink IP packet to the local edge server for processing.

In some embodiments of the present disclosure, the address translation control instruction is further configured for instructing the first user plane function entity, in response to receiving a downlink IP packet returned for the uplink IP packet by the local edge server, to modify a source address of the downlink IP packet to the network address of target application server, and forward the modified downlink IP packet to the user equipment.

In some embodiments of the present disclosure, the second determining unit 1304 is configured to: query a domain name list corresponding to the network address of the target application server according to the network address of the target application server; query to obtain a target domain name list that is configured to respond to the uplink IP packet according to the domain name list, a transport layer protocol used by the uplink IP packet, and a destination port included in the uplink IP packet; and query to obtain a network address list of the local edge server based on the target domain name list.

In some embodiments of the present disclosure, the second determining unit 1304 is configured to: use, based on a mapping relationship between a network address of an application server and a network address of a local edge server, a network address of a local edge server that has the mapping relationship with the network address of the target application server as the network address of the local edge server.

In some embodiments of the present disclosure, the second determining unit 1304 is configured to: query a domain name list corresponding to the network address of the target application server according to the network address of the target application server; and use a network address of an edge server corresponding to the domain name list as the network address of the local edge server according to the domain name list.

In some embodiments of the present disclosure, the second determining unit 1304 is configured to: query a domain name list corresponding to the network address of the target application server according to the network address of the target application server; query to obtain a corresponding target domain name list according to the domain name list, a transport layer protocol used by the uplink IP packet, and a destination port included in the uplink IP packet; and use, based on a mapping relationship between a domain name and a network address of an edge server, a network address list of an edge server having the mapping relationship with the target domain name list as the network address list of the local edge server that is configured to respond to the uplink IP packet.

In some embodiments of the present disclosure, the second determining unit 1304 is configured to: select, when the network address list of the local edge server includes a plurality of network addresses, a network address of a local edge server that is closest to the user equipment, or has a lowest communication latency with the user equipment, or has a lightest load from the plurality of network addresses.

Figure 14:
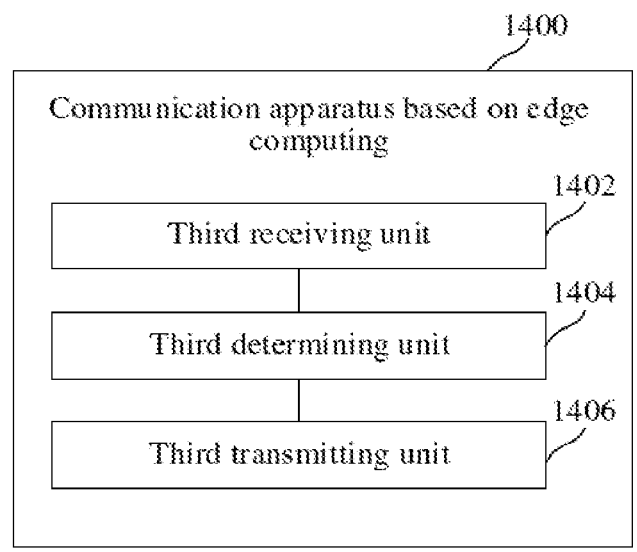
FIG. 14 is an example block diagram of a communication apparatus based on edge computing according to an embodiment of the present disclosure.

FIG. 14 show a block diagram of a communication apparatus based on edge computing according to an embodiment of the present disclosure. The communication apparatus may be provided inside the SMF entity.

Referring to FIG. 14, the communication apparatus 1400 based on edge computing according to the embodiment of the present disclosure includes: a third receiving unit 1402, a third determining unit 1404, and a third transmitting unit 1406.

The third receiving unit 1402 is configured to receive a network address of a target application server transmitted by a first user plane function entity, the network address of the target application server being a destination address in an uplink IP packet received by the first user plane function entity, and the uplink IP packet being transmitted by the user equipment. The third determining unit 1404 is configured to determine a network address of a local edge server that is configured to respond to the uplink IP packet according to the network address of the target application server. The third transmitting unit 1406 is configured to transmit an address translation control instruction to a second user plane function entity connected to the local edge server, the address translation control instruction being configured for instructing the second user plane function entity, in response to receiving the uplink IP packet transmitted by the user equipment to the target application server, to modify the destination address of the received uplink IP packet to the network address of the local edge server, and forward the modified uplink IP packet to the local edge server for processing.

In some embodiments of the present disclosure, the address translation control instruction is further configured for instructing the second user plane function entity, in response to receiving a downlink IP packet returned for the uplink IP packet by the local edge server, to modify a source address of the downlink IP packet to the network address of target application server, and forward the modified downlink IP packet to the user equipment.

In some embodiments of the present disclosure, the third transmitting unit 1406 is configured to: transmit an instruction message to the first user plane function entity, to instruct the first user plane function entity to forward the received uplink IP packet transmitted to the target application server by the user equipment to the second user plane function entity.

In some embodiments of the present disclosure, the third transmitting unit 1406 is configured to: transmit an instruction message to an uplink classifier connected to the second user plane function entity, to instruct the uplink classifier to transmit a data packet between the user equipment and the target application server to the second user plane function entity for forwarding processing.

Figure 15:
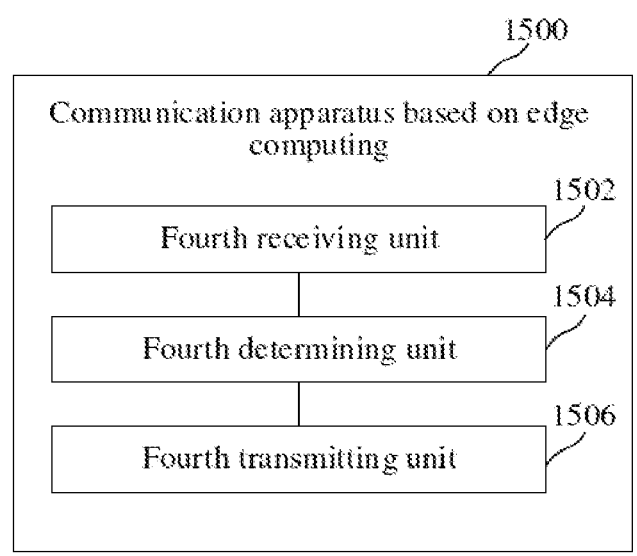
FIG. 15 is an example block diagram of a communication apparatus based on edge computing according to an embodiment of the present disclosure.

FIG. 15 show a block diagram of a communication apparatus based on edge computing according to an embodiment of the present disclosure. The communication apparatus may be provided inside the SMF entity.

Referring to FIG. 15, the communication apparatus 1500 based on edge computing according to the embodiment of the present disclosure includes: a fourth receiving unit 1502, a fourth determining unit 1504, and a fourth transmitting unit 1506.

The fourth receiving unit 1502 is configured to receive a network address of a target application server transmitted by a first user plane function entity, the network address of the target application server being a destination address in an uplink IP packet received by the first user plane function entity, and the uplink IP packet being transmitted by a user equipment. The fourth determining unit 1504 is configured to determine a network address of a local edge server that is configured to respond to the uplink IP packet according to the network address of the target application server. The fourth transmitting unit 1506 is configured to transmit an address translation control instruction to an uplink classifier connected to a second user plane function entity, the address translation control instruction being configured for instructing the uplink classifier, in response to receiving the uplink IP packet transmitted by the user equipment to the target application server, to modify the destination address of the received uplink IP packet to the network address of the local edge server, and forward the modified uplink IP packet to the local edge server for processing via the second user plane function entity.

In some embodiments of the present disclosure, the address translation control instruction is further configured for instructing the uplink classifier, in response to receiving a downlink IP packet returned for the uplink IP packet by the local edge server, to modify a source address of the downlink IP packet to the network address of the target application server, and forward the modified downlink IP packet to the user equipment.

In some embodiments of the present disclosure, the fourth transmitting unit 1506 is further configured to: transmit an instruction message to the first user plane function entity, to instruct the first user plane function entity to forward the received uplink IP packet transmitted to the target application server by the user equipment to the uplink classifier.

In some embodiments of the present disclosure, the fourth transmitting unit 1506 is further configured to: transmit an instruction message to the uplink classifier, to instruct the uplink classifier to transmit a data packet between the user equipment and the target application server to the second user plane function entity for forwarding processing.

Figure 16:
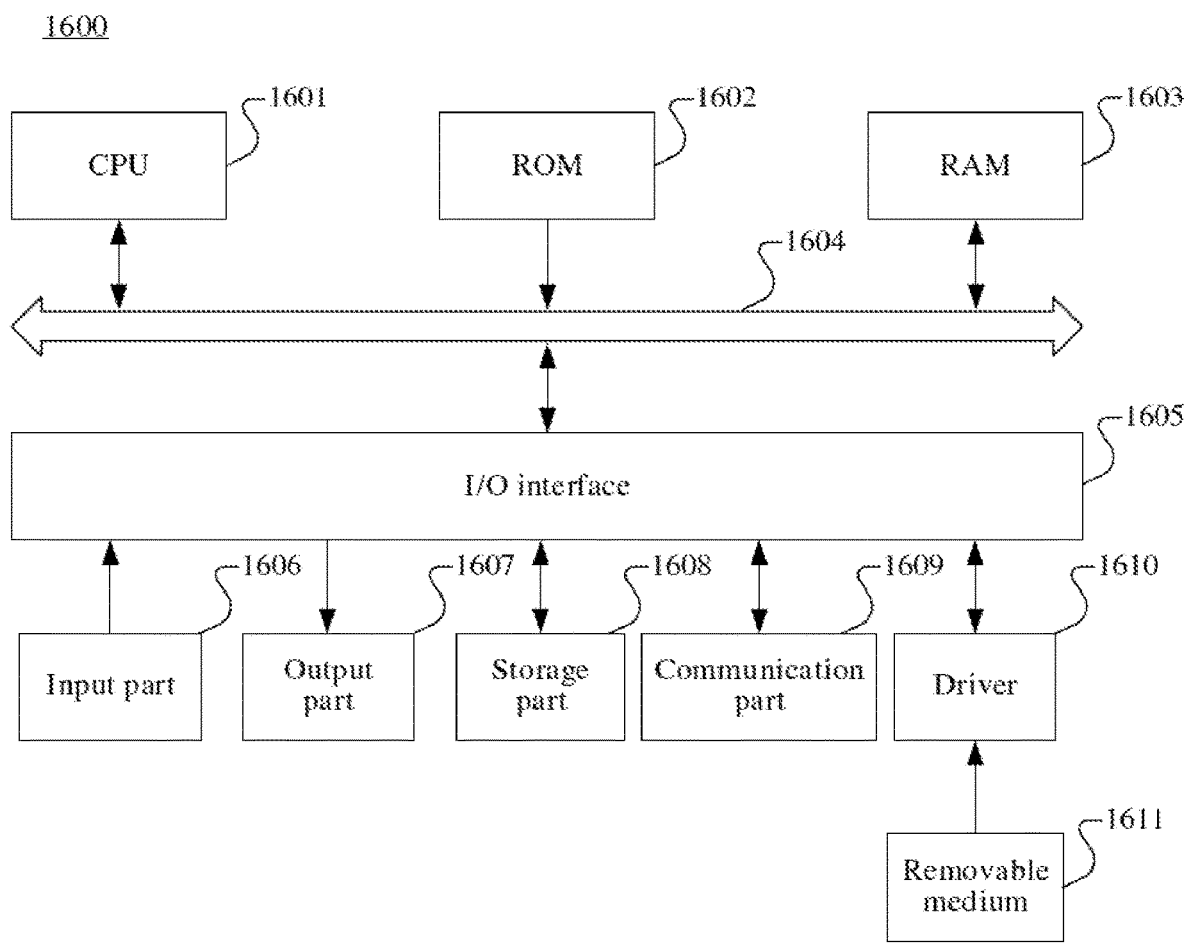
FIG. 16 is an example schematic structural diagram of a computer system of an electronic device according to an embodiment of the present disclosure.

FIG. 16 shows a schematic structural diagram of a computer system adapted to implement an electronic device according to an embodiment of the present disclosure.

The computer system 1600 of the electronic device shown in FIG. 16 is merely an example, and does not constitute any limitation on functions and use ranges of the embodiments of this application.

As shown in FIG. 16, the computer system 1600 includes a central processing unit (CPU) 1601, which may perform various suitable actions and processing based on a program stored in a read-only memory (ROM) 1602 or a program loaded from a storage part 1608 into a random access memory (RAM) 1603, for example, perform the method described in the foregoing embodiments. The RAM 1603 further stores various programs and data required for system operations. The CPU 1601, the ROM 1602, and the RAM 1603 are connected to each other through a bus 1604. An input/output (I/O) interface 1605 is also connected to the bus 1604.

The following components are connected to the I/O interface 1605: an input part 1606 including a keyboard, a mouse, etc.; an output part 1607 including a cathode ray tube (CRT), a liquid crystal display (LCD), a speaker, etc.; a storage part 1608 including a hard disk, etc.; and a communication part 1609 of a network interface card including a local area network (LAN) card, a modem, etc. The communication portion 1609 performs communication processing by using a network such as the Internet. A driver 1610 is also connected to the I/O interface 1605 as required. A removable medium 1611, such as a magnetic disk, an optical disc, a magneto-optical disk, or a semiconductor memory, is installed on the driver 1610 as required, so that a computer program read from the removable medium is installed into the storage part 1608 as required.

Particularly, according to an embodiment of the present disclosure, the processes described above by referring to the flowcharts may be implemented as computer software programs. For example, an embodiment of this application includes a computer program product. The computer program product includes a computer program stored in a computer-readable medium. The computer program includes a computer program used for performing a method shown in the flowchart. In such an embodiment, the computer program may be downloaded and installed from the network through the communication portion 1609, and/or installed from the removable medium 1611. When the computer program is executed by the CPU 1601, the various functions defined in the system of this application are executed.

The computer-readable medium shown in the embodiments of the present disclosure may be a computer-readable signal medium or a computer-readable storage medium or any combination thereof. The computer-readable storage medium may be, for example, but is not limited to, an electric, magnetic, optical, electromagnetic, infrared, or semi-conductive system, apparatus, or component, or any combination thereof. A more specific example of the computer-readable storage medium may include but is not limited to: an electrical connection having one or more wires, a portable computer magnetic disk, a hard disk, a RAM, a ROM, an erasable programmable read-only memory (EPROM), a flash memory, an optical fiber, a compact disc read-only memory (CD-ROM), an optical storage device, a magnetic storage device, or any appropriate combination thereof. In this application, the computer-readable storage medium may be any tangible medium containing or storing a program, and the program may be used by or used in combination with an instruction execution system, apparatus, or device. In this application, the computer-readable signal medium may include a data signal transmitted in a baseband or as part of a carrier, and stores a computer-readable computer program. The data signal propagated in such a way may assume a plurality of forms, including, but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in combination with an instruction execution system, apparatus, or device. The computer program included in the computer-readable medium may be transmitted by using any suitable medium, including but not limited to: a wireless medium, a wire, or the like, or any suitable combination thereof.

The flowcharts and block diagrams in the accompanying drawings illustrate possible system architectures, functions, and operations that may be implemented by a system, a method, and a computer program product according to various embodiments of this application. Each box in a flowchart or a block diagram may represent a module, a program segment, or a part of code. The module, the program segment, or the part of code includes one or more executable instructions used for implementing specified logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

Related units described in the embodiments of this application may be implemented in a software manner, or may be implemented in a hardware manner, and the unit described can also be set in a processor. Names of the units do not constitute a limitation on the units in a specific case.

The embodiments of the present disclosure further provide a computer-readable medium. The computer-readable medium may be included in the electronic device described in the foregoing embodiments; or may exist alone without being assembled into the electronic device. The computer-readable medium carries one or more programs, the one or more programs, when executed by the electronic device, causing the electronic device to implement the method described in the foregoing embodiments.

Although a plurality of modules or units of a device configured to perform actions are discussed in the foregoing detailed description, such division is not mandatory. Actually, according to the implementations of this application, the features and functions of two or more modules or units described above may be specifically implemented in one module or unit. On the contrary, the features and functions of one module or unit described above may be further divided to be embodied by a plurality of modules or units.

According to the foregoing descriptions of the implementations, a person skilled in the art may readily understand that the exemplary implementations described herein may be implemented by using software, or may be implemented by combining software and necessary hardware. Therefore, the technical solutions of the implementations of the present disclosure may be implemented in a form of a software product. The software product may be stored in a nonvolatile storage medium (which may be a CD-ROM, a USB flash drive, a removable hard disk, or the like) or on a network, including several instructions for instructing a computing device (which may be a personal computer, a server, a touch terminal, a network device, or the like) to perform the methods according to the implementations of the present disclosure.

What is claimed is:

1. A communication method based on edge computing, performed by an electronic device, and comprising:
   receiving an uplink Internet Protocol (IP) packet transmitted by a user equipment, a destination address of the uplink IP packet being a network address of a target application server;
   determining a network address of a local edge server that is configured to respond to the uplink IP packet according to the network address of the target application server; and
   modifying the destination address of the uplink IP packet to the network address of the local edge server, and forwarding the modified uplink IP packet to the local edge server for processing.

2. The communication method according to claim 1, wherein determining the network address of the local edge server that is configured to respond to the uplink IP packet according to the network address of the target application server comprises:
   querying a domain name list corresponding to the network address of the target application server according to the network address of the target application server;
   querying to obtain a corresponding target domain name list according to the domain name list, a transport layer protocol used by the uplink IP packet, and a destination port comprised in the uplink IP packet; and
   querying to obtain a network address list of the local edge server based on the target domain name list, and obtaining the network address of the local edge server that is configured to respond to the uplink IP packet based on the network address list.

3. The communication method according to claim 2, wherein:
   querying to obtain the corresponding target domain name list according to the domain name list, the transport layer protocol used by the uplink IP packet, and the destination port comprised in the uplink IP packet comprises:
   initiating a service record (SRV) query to an edge domain name system (DNS) server according to the domain name list, the transport layer protocol used by the uplink IP packet, and the destination port, to obtain the target domain name list; and
   querying to obtain the network address list of the local edge server based on the target domain name list comprises:
   querying to obtain the network address list of the local edge server from the edge DNS server based on the target domain name list.

4. The communication method according to claim 2, wherein obtaining the network address of the local edge server that is configured to respond to the uplink IP packet based on the network address list comprises:
   reporting the network address list and the network address of the target application server to a session management function entity, to allow the session management function entity to select the network address of the local edge server that is configured to respond to the uplink IP packet from the network address list.

5. The communication method according to claim 1, wherein determining the network address of a local edge server that is configured to respond to the uplink IP packet according to the network address of the target application server comprises:
- reporting the network address of the target application server to a session management function entity, to allow the session management function entity to determine the network address of the local edge server according to the network address of the target application server; or
- querying a domain name list corresponding to the network address of the target application server according to the network address of the target application server, and reporting the domain name list to a session management function entity, to allow the session management function entity to determine the network address of the local edge server according to the domain name list.

6. The communication method according to claim 1, wherein before modifying the destination address of the uplink IP packet to the network address of the local edge server, the communication method further comprises:
- receiving an address translation control instruction transmitted by a session management function entity, the address translation control instruction being configured for instructing to modify the destination address of the uplink IP packet transmitted to the target application server by the user equipment to the network address of the local edge server.

7. The communication method according to claim 6, wherein:
- the address translation control instruction is further configured for instructing to modify a source address of a downlink IP packet returned for the uplink IP packet by the local edge server to the network address of the target application server; and
- the communication method further comprises:
  - receiving the downlink IP packet returned for the uplink IP packet by the local edge server, the source address of the downlink IP packet being the network address of the local edge server; and
  - modifying the source address of the downlink IP packet to the network address of the target application server, and forwarding the modified downlink IP packet to the user equipment.

8. The communication method according to claim 1, further comprising:
- before forwarding the modified uplink IP packet to the local edge server for processing, modifying a source port value of the uplink IP packet to a preset identification value, and recording a correspondence between the source port value of the uplink IP packet and the preset identification value; and
- modifying, in response to receiving a downlink IP packet returned by the local edge server, a destination port value of the downlink IP packet to the source port value of the uplink IP packet when the destination port value of the downlink IP packet matches the preset identification value.

9. The communication method according to claim 1, wherein when a new target user plane function entity connected to the local edge server is used, modifying the destination address of the uplink IP packet to the network address of the local edge server, and forwarding the modified uplink IP packet to the local edge server for processing comprises:
- transmitting the uplink IP packet directly to the target user plane function entity, to allow the target user plane function entity to modify the destination address of the uplink IP packet to the network address of the local edge server, and to forward the modified uplink IP packet to the local edge server for processing; or
- transmitting the uplink IP packet to the target user plane function entity via a session management function entity, to allow the target user plane function entity to modify the destination address of the uplink IP packet to the network address of the local edge server, and to forward the modified uplink IP packet to the local edge server for processing.

10. The communication method according to claim 1, wherein when a new target user plane function entity connected to the local edge server is used, modifying the destination address of the uplink IP packet to the network address of the local edge server, and forwarding the modified uplink IP packet to the local edge server for processing comprises:
- transmitting the uplink IP packet directly to an uplink classifier, to allow the uplink classifier to modify the destination address of the uplink IP packet to the network address of the local edge server, and to forward the modified uplink IP packet to the local edge server for processing via the target user plane function entity connected to the local edge server; or
- transmitting the uplink IP packet to an uplink classifier via a session management function entity, to allow the uplink classifier to modify the destination address of the uplink IP packet to the network address of the local edge server, and to forward the modified uplink IP packet to the local edge server for processing via the target user plane function entity connected to the local edge server.

11. A communication method based on edge computing, performed by an electronic device, and comprising:
- receiving a network address of a target application server transmitted by a first user plane function entity, the network address of the target application server being a destination address in an uplink IP packet received by the first user plane function entity, and the uplink IP packet being transmitted by a user equipment;
- determining a network address of a local edge server that is configured to respond to the uplink IP packet according to the network address of the target application server; and
- transmitting an address translation control instruction to the first user plane function entity, the address translation control instruction being configured for instructing the first user plane function entity to modify the destination address of the uplink IP packet to the network address of the local edge server, and to forward the modified uplink IP packet to the local edge server for processing.

12. The communication method according to claim 11, wherein the address translation control instruction is further configured for instructing the first user plane function entity, in response to receiving a downlink IP packet returned for the uplink IP packet by the local edge server, to modify a source address of the downlink IP packet to the network address of target application server, and to forward the modified downlink IP packet to the user equipment.

13. The communication method according to claim 11, wherein determining the network address of the local edge server that is configured to respond to the uplink IP packet according to the network address of the target application server comprises:

querying a domain name list corresponding to the network address of the target application server according to the network address of the target application server;

querying to obtain a corresponding target domain name list according to the domain name list, a transport layer protocol used by the uplink IP packet, and a destination port comprised in the uplink IP packet; and querying to obtain a network address list of the local edge server that is configured to respond to the uplink IP packet based on the target domain name list.

14. The communication method according to claim 11, wherein determining the network address of the local edge server that is configured to respond to the uplink IP packet according to the network address of the target application server comprises:

using, based on a mapping relationship between a network address of an application server and a network address of a local edge server, a network address of a local edge server that has the mapping relationship with the network address of the target application server as the network address of the local edge server.

15. The communication method according to claim 11, wherein determining a network address of the local edge server that is configured to respond to the uplink IP packet according to the network address of the target application server comprises:

querying a domain name list corresponding to the network address of the target application server according to the network address of the target application server; and using a network address of an edge server corresponding to the domain name list as the network address of the local edge server according to the domain name list.

16. The communication method according to claim 11, wherein determining the network address of the local edge server that is configured to respond to the uplink IP packet according to the network address of the target application server comprises:

querying a domain name list corresponding to the network address of the target application server according to the network address of the target application server;

querying to obtain a corresponding target domain name list according to the domain name list, a transport layer protocol used by the uplink IP packet, and a destination port comprised in the uplink IP packet; and using, based on a mapping relationship between a domain name and a network address of an edge server, a network address list of an edge server having the mapping relationship with the target domain name list as a network address list of the local edge server that is configured to respond to the uplink IP packet.

17. The communication method according to claim 13, wherein when the network address list comprises a plurality of network addresses, a network address of a local edge server that is closest to the user equipment, or has a lowest communication latency with the user equipment, or has a lightest load is selected from the plurality of network addresses.

18. A communication method based on edge computing, performed by an electronic device, and comprising:

receiving a network address of a target application server transmitted by a first user plane function entity, the network address of the target application server being a destination address in an uplink IP packet received by the first user plane function entity, and the uplink IP packet being transmitted by a user equipment;

determining a network address of a local edge server that is configured to respond to the uplink IP packet according to the network address of the target application server; and transmitting an address translation control instruction to a second user plane function entity connected to the local edge server, the address translation control instruction being configured for instructing the second user plane function entity, in response to receiving the uplink IP packet transmitted by the user equipment to the target application server, to modify the destination address of the received uplink IP packet to the network address of the local edge server, and to forward the modified uplink IP packet to the local edge server for processing.

19. The communication method according to claim 18, wherein the address translation control instruction is further configured for instructing the second user plane function entity, in response to receiving a downlink IP packet returned for the uplink IP packet by the local edge server, to modify a source address of the downlink IP packet to the network address of target application server, and to forward the modified downlink IP packet to the user equipment.

20. The communication method according to claim 18, further comprising:

transmitting an instruction message to the first user plane function entity, to instruct the first user plane function entity to forward the received uplink IP packet transmitted to the target application server by the user equipment to the second user plane function entity; or transmitting an instruction message to an uplink classifier connected to the second user plane function entity, to instruct the uplink classifier to transmit a data packet between the user equipment and the target application server to the second user plane function entity for forwarding processing.

* * * * *